US012720076B2

(12) United States Patent
Deng et al.

(10) Patent No.: US 12,720,076 B2
(45) Date of Patent: Aug. 25, 2026

(54) ON BOUNDARY PADDING SAMPLES GENERATION IN IMAGE/VIDEO CODING

(71) Applicants: Beijing Bytedance Network Technology Co., Ltd., Beijing (CN); Bytedance Inc., Los Angeles, CA (US)

(72) Inventors: Zhipin Deng, Beijing (CN); Kai Zhang, San Diego, CA (US); Li Zhang, San Diego, CA (US); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 145 days.

(21) Appl. No.: 18/452,287

(22) Filed: Aug. 18, 2023

(65) Prior Publication Data

US 2023/0396777 A1 Dec. 7, 2023

Related U.S. Application Data

(63) Continuation of application No. PCT/CN2022/076613, filed on Feb. 17, 2022.

(30) Foreign Application Priority Data

Feb. 20, 2021 (WO) ................ PCT/CN2021/077050

(51) Int. Cl.
*H04N 19/563* (2014.01)
*H04N 19/159* (2014.01)
(Continued)

(52) U.S. Cl.
CPC ......... *H04N 19/159* (2014.11); *H04N 19/176* (2014.11); *H04N 19/184* (2014.11); *H04N 19/513* (2014.11)

(58) Field of Classification Search
None
See application file for complete search history.

(56) References Cited

U.S. PATENT DOCUMENTS

2016/0219298 A1* 7/2016 Li ........................ H04N 19/186
2019/0082193 A1* 3/2019 Sun ....................... H04N 19/82
(Continued)

FOREIGN PATENT DOCUMENTS

WO 2020007717 A1 1/2020

OTHER PUBLICATIONS

Document: JVET-J0021, Chen, Y., et al., "Description of SDR, HDR and 360° video coding technology proposal by Qualcomm and Technicolor—low and high complexity versions," Joint Video Exploration Team (JVET) of ITU-T SG 16 WP 3 and ISO/IEC JTC 1/SC 29/WG 11 10th Meeting: San Diego, US, Apr. 10-20, 2018, 43 pages.

(Continued)

*Primary Examiner* — Christopher G Findley
(74) *Attorney, Agent, or Firm* — Conley Rose, P.C.

(57) ABSTRACT

A method for coding video data implemented by a video coding apparatus. The method includes filling an extended area disposed around a video unit with padding samples to generate a larger video unit. Some of the padding samples are generated without duplicating boundary samples within the video unit. The method further includes converting between the video unit of the video and a bitstream in accordance with the extended area as filled.

18 Claims, 11 Drawing Sheets

600

Fill an extended area disposed around a video unit with padding samples to generate a larger video unit, where some of the padding samples are generated without duplicating boundary samples within the video unit — 602

Convert between the video unit of the video and a bitstream in accordance with the extended area as filled — 604

(51) Int. Cl.
*H04N 19/176* (2014.01)
*H04N 19/184* (2014.01)
*H04N 19/513* (2014.01)

(56) References Cited

U.S. PATENT DOCUMENTS

2020/0221109 A1 7/2020 Xu
2021/0029353 A1* 1/2021 Brandenburg ....... H04N 19/172
2023/0328257 A1* 10/2023 Zhang .................. H04N 19/563

OTHER PUBLICATIONS

Series H: Audiovisual and Multimedia Systems Infrastructure of audiovisual services—Coding of moving video High efficiency video coding, Rec. ITU-T H.265 | ISO/IEC 23008-2(in force edition), Feb. 2018, 692 pages.

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

Document: JVET-Q2002-v1, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 92 pages.

VTM software: Retrieved from the Internet: https://vcgit.hhi.fraunhofer.de/jvet/VVCSoftware_VTM.git, Oct. 18, 2022, 3 pages.

Document: JVET-L0223-v3, Brandenburg, J., et al., "CE4.6: Intra and Inter/Intra Boundary Padding," Joint Video Experts Team (JVET) of ITU-T SG 16 WP 3 and ISO/[EC JTC I/SC 29/WG 11, 12th Meeting: Macao, CN, Oct. 3-12, 2018, 4 pages.

Document: JVET-K0363, Zhang, Y., "CE4.5.2: Motion compensated boundary pixel padding," Joint Video Exploration Team (JVET) of ITU-T SG 16 WP 3 and ISO/IEC JTC 1/SC 29/WG 11 11th Meeting: Ljubljana, SI, Jul. 10-18, 2018, 3 pages.

International Search Report from PCT Application No. PCT/CN2022/076613 dated May 27, 2022, 9 pages.

* cited by examiner

ON BOUNDARY PADDING SAMPLES GENERATION IN IMAGE/VIDEO CODING

CROSS-REFERENCE TO RELATED APPLICATIONS

This application is a continuation of International Patent Application No. PCT/CN2022/076613, filed on Feb. 17, 2022, which claims the priority to and benefits of International Application No. PCT/CN2021/077050 filed on Feb. 20, 2021. All the aforementioned patent applications are hereby incorporated by reference in their entireties.

TECHNICAL FIELD

The present disclosure is generally related to video coding and, in particular, to inter prediction in image/video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments fill an extended area around a video unit with padding samples to generate a larger video unit. However, some of the padding samples (e.g., one or more of the padding samples) are generated without duplicating boundary samples within the video unit, instead of generating all of the padding samples using duplication/repetition. Thus, video coding is improved relative to existing techniques.

A first aspect relates to a method for coding video data implemented by a video coding apparatus. The method includes filling an extended area disposed around a video unit with padding samples to generate a larger video unit, wherein some of the padding samples are generated without duplicating boundary samples within the video unit; and converting between the video unit of the video and a bitstream in accordance with the extended area as filled.

Optionally, in any of the preceding aspects, another implementation of the aspect provides that some of the padding samples are generated by duplicating the boundary samples within the video unit.

Optionally, in any of the preceding aspects, another implementation of the aspect provides that some of the padding samples are predicted samples or interpolated samples from the video unit or a reference video unit.

Optionally, in any of the preceding aspects, another implementation of the aspect provides that the predicted samples or the interpolated samples are generated using a prediction method, and wherein the prediction method is intra prediction, inter prediction, intra block copy (IBC), or palette coding.

Optionally, in any of the preceding aspects, another implementation of the aspect provides that some of the padding samples in the extended area are derived from the padding samples already in the extended area.

Optionally, in any of the preceding aspects, another implementation of the aspect provides that some of the padding samples are generated based on a prediction mode of boundary samples of the video unit or a reference video unit, and wherein the prediction mode comprises an intra prediction mode, an inter prediction mode, or an intra block copy prediction mode.

Optionally, in any of the preceding aspects, another implementation of the aspect provides that some of the padding samples are derived from predicted samples or interpolated samples from the video unit, wherein the predicted samples are derived based on a motion vector of a boundary sample, and wherein the interpolated samples are derived using an interpolation filter.

Optionally, in any of the preceding aspects, another implementation of the aspect provides that some of the padding samples are derived from predicted samples, wherein the predicted samples are derived based on a block vector of a boundary sample, and wherein the block vector is a modified block vector, a clipped block vector, a weighted block vector, or a shifted block vector.

Optionally, in any of the preceding aspects, another implementation of the aspect provides that some of the padding samples are derived from predicted samples, and wherein the predicted samples are derived by applying angular prediction to boundary samples within the video unit.

Optionally, in any of the preceding aspects, another implementation of the aspect provides that some of the padding samples are derived from predicted samples or interpolated samples in a reference video unit, wherein the predicted samples are derived based on a motion vector of a boundary sample, and wherein the interpolated samples are derived using an interpolation filter.

Optionally, in any of the preceding aspects, another implementation of the aspect provides that some of the padding samples are derived from predicted samples, wherein the predicted samples are derived based on a motion vector of a boundary sample, and wherein the motion vector is a modified motion vector, a clipped motion vector, a weighted motion vector, or a shifted motion vector.

Optionally, in any of the preceding aspects, another implementation of the aspect provides that some of the padding samples are generated by motion-compensated prediction other than duplicating boundary samples only when the boundary samples in the video unit corresponding thereto are coded by inter prediction or intra block copy (IBC).

Optionally, in any of the preceding aspects, another implementation of the aspect provides that some of the padding samples are generated by duplicating boundary samples when the boundary samples in the video unit corresponding thereto are coded by intra block copy (IBC), by intra prediction, or by palette coding.

Optionally, in any of the preceding aspects, another implementation of the aspect provides that some of the padding samples are generated by blending more than one prediction sample from a reference video unit.

Optionally, in any of the preceding aspects, another implementation of the aspect provides that the decision to perform the blending is based on whether the prediction samples are disposed within the reference video unit or in an extended area around the reference video unit.

Optionally, in any of the preceding aspects, another implementation of the aspect provides that some of the padding samples are generated by selecting one of two prediction samples available when a boundary block is predicted using bidirectional inter prediction.

Optionally, in any of the preceding aspects, another implementation of the aspect provides that some of the padding samples are generated using a prediction sample derived from a scaled motion vector.

Optionally, in any of the preceding aspects, another implementation of the aspect provides that some of the padding samples are generated based on a weighted prediction sample, and wherein the weighted prediction sample is generated by weighting more than one prediction sample.

Optionally, in any of the preceding aspects, another implementation of the aspect provides that the padding samples are generated based on a synthesized motion vector produced from multiple motion vectors of multiple adjacent coding blocks inside the video unit, or based on a motion trajectory built from the multiple motion vectors of the multiple adjacent coding blocks inside the video unit.

Optionally, in any of the preceding aspects, another implementation of the aspect provides that the padding samples are generated based on whether or not boundary samples predicted using an affine model.

Optionally, in any of the preceding aspects, another implementation of the aspect provides that the padding samples are generated based on whether or not boundary samples are coded using bidirectional inter prediction with coding unit (CU)-level weights (BCW), based on whether or not the boundary samples are coded using half-pel interpolation, based on whether or not the boundary samples are coded using combined inter-intra prediction (CIIP), or based on whether or not the boundary samples are coded using geometric partitioning mode (GPM).

A second aspect relates to an apparatus for coding video data comprising a processor and a non-transitory memory with instructions thereon, wherein the instructions upon execution by the processor cause the processor to perform any of the methods disclosed herein.

A third aspect relates to a non-transitory computer readable medium comprising a computer program product for use by a coding apparatus, the computer program product comprising computer executable instructions stored on the non-transitory computer readable medium that, when executed by one or more processors, cause the coding apparatus to perform any of the methods disclosed herein.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding standards have evolved primarily through the development of the well-known International Telecommunication Union—Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard, also known as H.266, targeting a fifty percent (50%) bitrate reduction compared to HEVC. The first version of VVC was finalized in July 2020.

H.266 terminology is used in some description only for ease of understanding and not for limiting scope of the disclosed techniques. As such, the techniques described herein are applicable to other video codec protocols and designs also. The ideas may be applied individually or in various combination, to any image/video coding standard or non-standard image/video codec, e.g., next-generation image/video coding standard.

Figure 1:
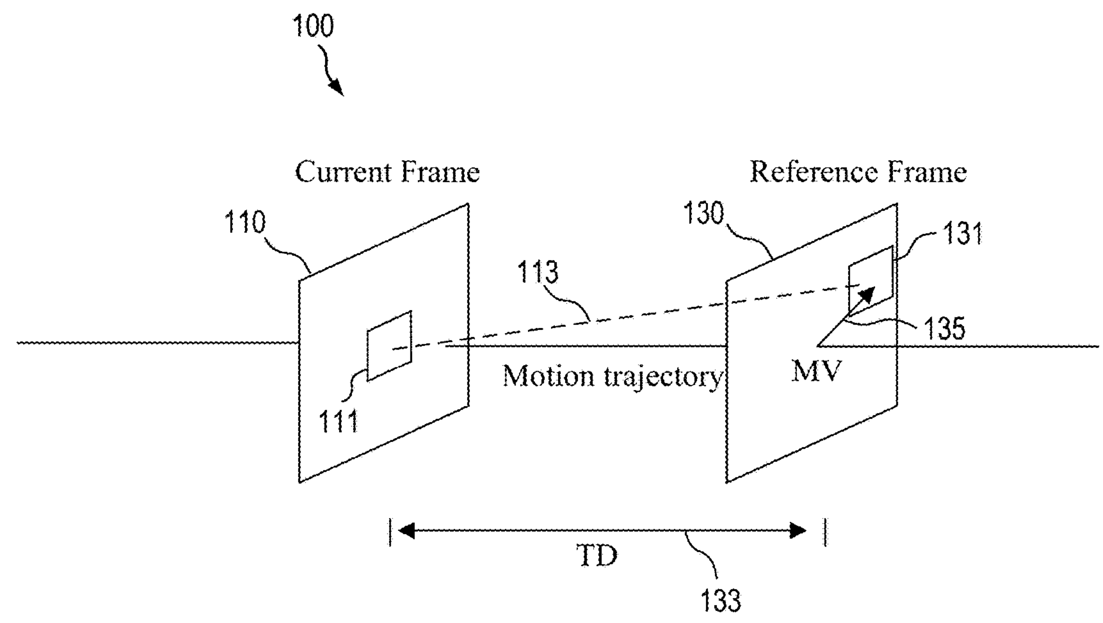
FIG. 1 is a schematic diagram illustrating an example of unidirectional inter prediction.

FIG. 1 is a schematic diagram illustrating an example of unidirectional inter prediction 100. Unidirectional inter prediction 100 can be employed to determine motion vectors for encoded and/or decoded blocks created when partitioning a picture.

Unidirectional inter prediction 100 employs a reference frame 130 with a reference block 131 to predict a current block 111 in a current frame 110. The reference frame 130 may be temporally positioned after the current frame 110 as shown (e.g., as a subsequent reference frame), but may also be temporally positioned before the current frame 110 (e.g., as a preceding reference frame) in some examples. The current frame 110 is an example frame/picture being encoded/decoded at a particular time. The current frame 110 contains an object in the current block 111 that matches an object in the reference block 131 of the reference frame 130. The reference frame 130 is a frame that is employed as a reference for encoding a current frame 110, and a reference block 131 is a block in the reference frame 130 that contains an object also contained in the current block 111 of the current frame 110.

The current block 111 is any coding unit that is being encoded/decoded at a specified point in the coding process. The current block 111 may be an entire partitioned block, or may be a sub-block when employing affine inter prediction mode. The current frame 110 is separated from the reference frame 130 by some temporal distance (TD) 133. The TD 133 indicates an amount of time between the current frame 110 and the reference frame 130 in a video sequence, and may be measured in units of frames. The prediction information for the current block 111 may reference the reference frame 130 and/or reference block 131 by a reference index indicating the direction and temporal distance between the frames. Over the time period represented by the TD 133, the object in the current block 111 moves from a position in the current frame 110 to another position in the reference frame 130 (e.g., the position of the reference block 131). For example, the object may move along a motion trajectory 113, which is a direction of movement of an object over time. A motion vector 135 describes the direction and magnitude of the movement of the object along the motion trajectory 113 over the TD 133. Accordingly, an encoded motion vector 135, a reference block 131, and a residual including the difference between the current block 111 and the reference block 131 provides information sufficient to reconstruct a current block 111 and position the current block 111 in the current frame 110.

Figure 2:
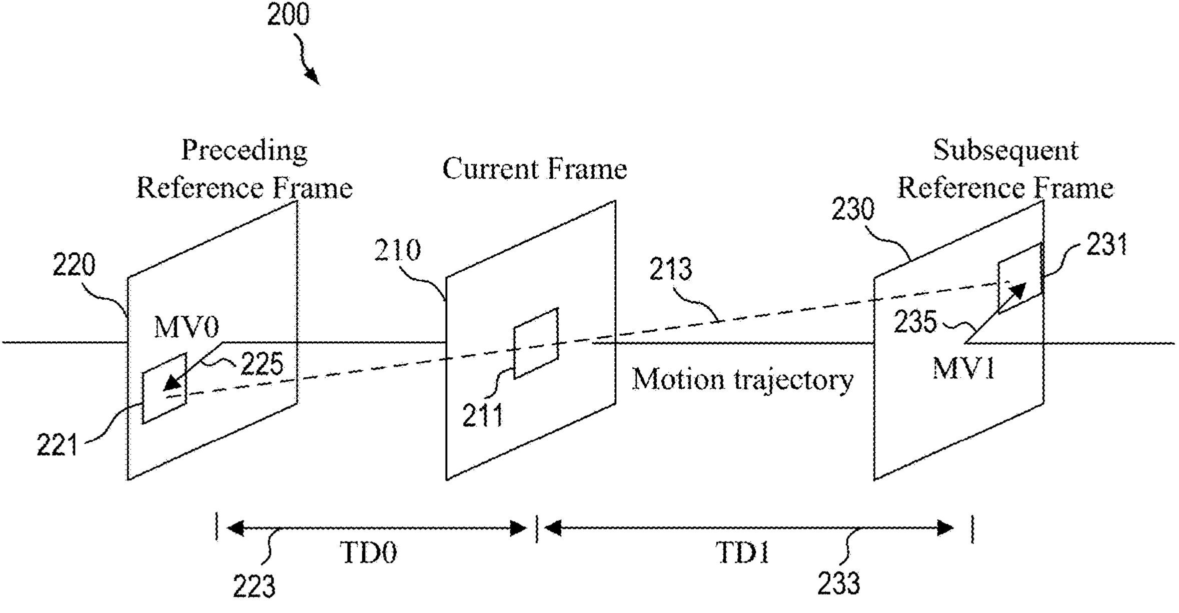
FIG. 2 is a schematic diagram illustrating an example of bidirectional inter prediction.

FIG. 2 is a schematic diagram illustrating an example of bidirectional inter prediction 200. Bidirectional inter prediction 200 can be employed to determine motion vectors for encoded and/or decoded blocks created when partitioning a picture.

Bidirectional inter prediction 200 is similar to unidirectional inter prediction 100, but employs a pair of reference frames to predict a current block 211 in a current frame 210. Hence current frame 210 and current block 211 are substantially similar to current frame 110 and current block 111, respectively. The current frame 210 is temporally positioned between a preceding reference frame 220, which occurs before the current frame 210 in the video sequence, and a subsequent reference frame 230, which occurs after the current frame 210 in the video sequence. Preceding reference frame 220 and subsequent reference frame 230 are otherwise substantially similar to reference frame 130.

The current block 211 is matched to a preceding reference block 221 in the preceding reference frame 220 and to a subsequent reference block 231 in the subsequent reference frame 230. Such a match indicates that, over the course of the video sequence, an object moves from a position at the preceding reference block 221 to a position at the subsequent reference block 231 along a motion trajectory 213 and via the current block 211. The current frame 210 is separated from the preceding reference frame 220 by some preceding temporal distance (TD0) 223 and separated from the subsequent reference frame 230 by some subsequent temporal distance (TD1) 233. The TD0 223 indicates an amount of time between the preceding reference frame 220 and the current frame 210 in the video sequence in units of frames. The TD1 233 indicates an amount of time between the current frame 210 and the subsequent reference frame 230 in the video sequence in units of frame. Hence, the object moves from the preceding reference block 221 to the current block 211 along the motion trajectory 213 over a time period indicated by TD0 223. The object also moves from the current block 211 to the subsequent reference block 231 along the motion trajectory 213 over a time period indicated by TD1 233. The prediction information for the current block 211 may reference the preceding reference frame 220 and/or preceding reference block 221 and the subsequent reference frame 230 and/or subsequent reference block 231 by a pair of reference indices indicating the direction and temporal distance between the frames.

A preceding motion vector (MV0) 225 describes the direction and magnitude of the movement of the object along the motion trajectory 213 over the TD0 223 (e.g., between the preceding reference frame 220 and the current frame 210). A subsequent motion vector (MV1) 235 describes the direction and magnitude of the movement of the object along the motion trajectory 213 over the TD1 233 (e.g., between the current frame 210 and the subsequent reference frame 230). As such, in bidirectional inter prediction 200, the current block 211 can be coded and reconstructed by employing the preceding reference block 221 and/or the subsequent reference block 231, MV0 225, and MV1 235.

In an embodiment, inter prediction and/or bi-directional inter prediction may be carried out on a sample-by-sample (e.g., pixel-by-pixel) basis instead of on a block-by-block basis. That is, a motion vector pointing to each sample in the preceding reference block 221 and/or the subsequent reference block 231 can be determined for each sample in the current block 211. In such embodiments, the motion vector 225 and the motion vector 235 depicted in FIG. 2 represent a plurality of motion vectors corresponding to the plurality of samples in the current block 211, the preceding reference block 221, and the subsequent reference block 231.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter prediction 100, bidirectional inter prediction 200, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter prediction 100 and/or bidirectional inter prediction 200, depending on which approach is used when such neighboring blocks are encoded.

Figure 3:
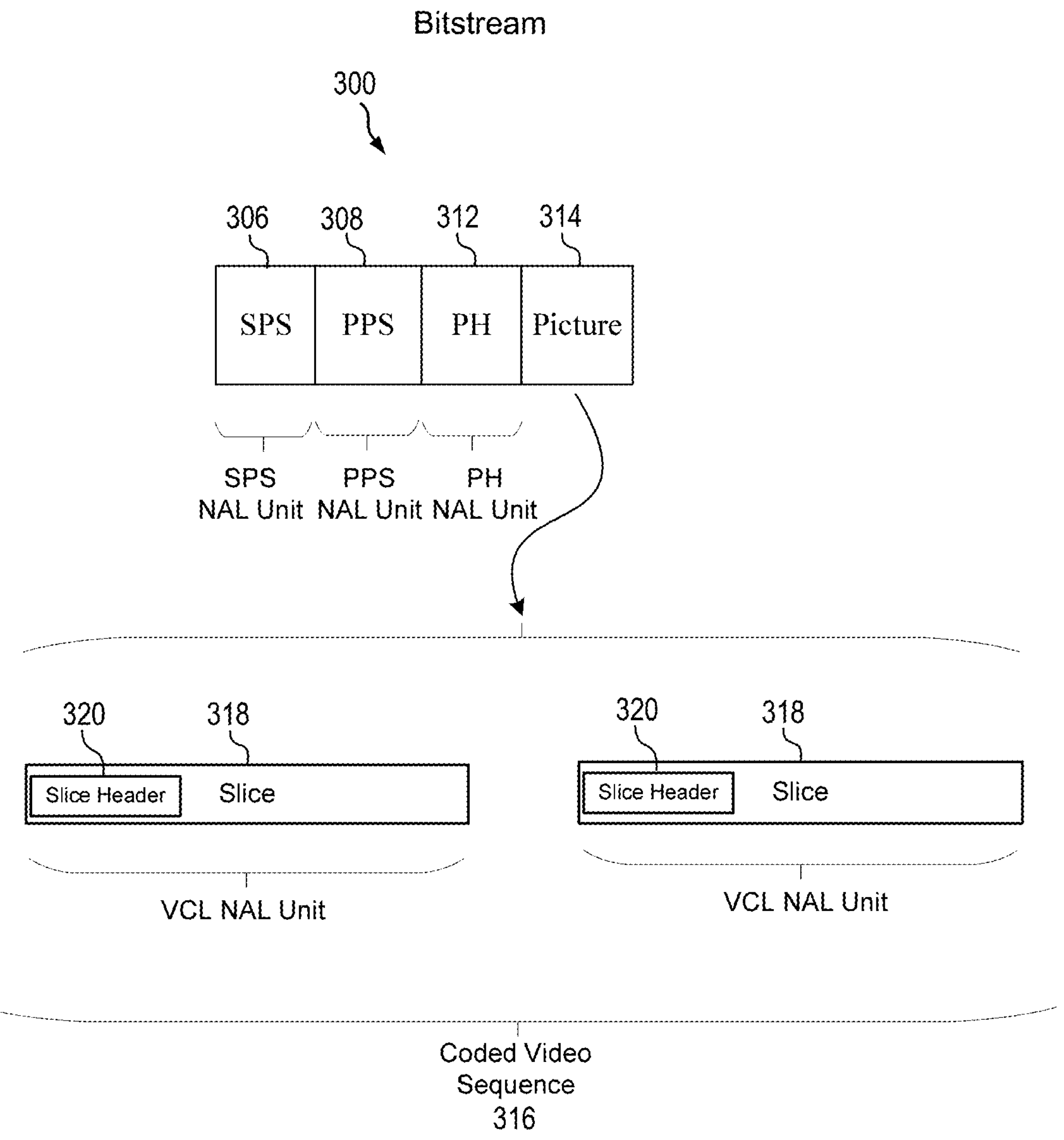
FIG. 3 is a schematic diagram of an embodiment of a video bitstream.

FIG. 3 is a schematic diagram of an embodiment of a video bitstream 300. As used herein the video bitstream 300 may also be referred to as a coded video bitstream, a bitstream, or variations thereof. As shown in FIG. 3, the bitstream 300 comprises one or more of the following: a sequence parameter set (SPS) 306, a picture parameter set (PPS) 308, a picture header (PH) 312, and a picture 314. The SPS 306 and the PPS 308 may be generically referred to as a parameter set. In an embodiment, other parameter sets not shown in FIG. 3 may also be included in the bitstream 300 such as, for example, a video parameter set (VPS), an adaption parameter set (APS), and so on.

The SPS 306 contains data that is common to all the pictures in a sequence of pictures (SOP). The SPS 306 is a syntax structure containing syntax elements that apply to zero or more entire CLVSs as determined by the content of a syntax element found in the PPS referred to by a syntax element found in each picture header. In contrast, the PPS 308 contains data that is common to the entire picture. The PPS 308 is a syntax structure containing syntax elements that apply to zero or more entire coded pictures.

The SPS 306, and the PPS 308 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the SPS 306 is a non-VCL NAL unit designated as a SPS NAL unit. Therefore, the SPS NAL unit has an SPS NUT. In an embodiment, the PPS 308 is contained in a non-VCL NAL unit designated as a PPS NAL unit. Therefore, the PPS NAL unit has a PPS NUT.

The PH 312 is a syntax structure containing syntax elements that apply to all slices (e.g., slices 318) of a coded picture (e.g., picture 314). In an embodiment, the PH 312 is in a non-VCL NAL unit designated a PH NAL unit. Therefore, the PH NAL unit has a PH NUT (e.g., PH_NUT). In an embodiment, one PH NAL unit is present for each picture 314 in the bitstream 300.

The picture 314 is an array of luma samples in monochrome format or an array of luma samples and two corresponding arrays of chroma samples in 4:2:0, 4:2:2, and 4:4:4 color format. The picture 314 may be either a frame or a field. However, in one coded video sequence (CVS) 316, either all pictures 314 are frames or all pictures 314 are fields. The CVS 316 is a coded video sequence for every coded layer video sequence (CLVS) in the video bitstream 300. Notably, the CVS 316 and the CLVS are the same when the video bitstream 300 includes a single layer. The CVS 316 and the CLVS are only different when the video bitstream 300 includes multiple layers.

Each picture 314 contains one or more slices 318. A slice 318 is an integer number of complete tiles or an integer number of consecutive complete coding tree unit (CTU) rows within a tile of a picture (e.g., picture 314). Each slice 318 is exclusively contained in a single NAL unit (e.g., a VCL NAL unit). A tile (not shown) is a rectangular region of CTUs within a particular tile column and a particular tile row in a picture (e.g., picture 314). A CTU (not shown) is a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

Each CTB can be differently split into multiple coding blocks (CBs). The CB is the decision point whether to perform inter-picture or intra-picture prediction. More precisely, the prediction type is coded in a coding unit (CU). A CU consists of three CBs (Y, Cb, and Cr) and associated syntax elements.

In an embodiment, each slice 318 contains a slice header 320. A slice header 320 is the part of the coded slice 318 containing the data elements pertaining to all tiles or CTU rows within a tile represented in the slice 318. That is, the slice header 320 contains information about the slice 318 such as, for example, the slice type, which of the reference pictures will be used, and so on.

The pictures 314 and their slices 318 comprise data associated with the images or video being encoded or decoded. Thus, the pictures 314 and their slices 318 may be simply referred to as the payload or data being carried in the bitstream 300.

Those skilled in the art will appreciate that the bitstream 300 may contain other parameters and information in practical applications.

Duplicate or repetitive padding may be used to expand a picture to a bigger size. More specifically, reference pictures (e.g., reference frame 130 in FIG. 1, or preceding reference frame 220 or subsequent reference frame 231 in FIG. 2) are extended to form a bigger picture. For example, boundary samples located at a left boundary of the reference picture are copied to the left of the reference picture, boundary samples located at a right boundary of the reference picture are copied to the right of the reference picture, boundary samples located at a top boundary of the reference picture are copied above the reference picture, and boundary samples located at a bottom boundary of the reference picture are copied below the reference picture. These copied boundary samples located outside the reference picture are referred to as padded samples (a.k.a., padding samples).

For current picture coding, when a motion vector (e.g., MV 135) of a current block (e.g., current block 111) points to a reference block (e.g., reference block 131) which (partially or completely) locates outside the reference picture (e.g., reference frame 130), the prediction block of the current block is generated from padded samples outside the reference picture boundary.

Motion compensated boundary padding is discussed in "Description of SDR HDR and 360 video coding technology proposal by Qualcomm and Technicolor—low and high complexity versions" by Y. W. Chen, et al., JEVT document JVET-J0021, 2018. When a decoder performs motion compensation, if the motion vector points to a block outside the reference frame boundary, a part of the reference block is unavailable. To remedy that issue, the reference picture/frame may be expanded or enlarged using padded samples. For each region with a size of 4×M or M×4 along the boundary of the reference picture to be padded, M being the desired frame boundary extension, a motion vector is derived from the nearest 4×4 block inside the frame. If the nearest 4×4 block is intra coded, a zero motion vector is used. If the nearest 4×4 block is coded with bi-directional inter prediction, only the motion vector, which points to the pixel farther away from the frame boundary, is used in motion compensation for padding. After the motion vector derivation, motion compensation is then performed to obtain the pixels in the padding region with the consideration of average pixel value offset between the nearest 4×4 block and its corresponding block in its reference picture.

Due to the rationale of duplicate padding in the existing standard, the padding length can be any value as long as the padding length does not exceed the allowed range of motion vectors. This rationale is no longer efficient when a motion-compensated padding is applied.

The existing picture boundary padding copy samples from the boundary to the extended areas. Moreover, the conventional motion compensated padding methods simply derive motion vectors from M×4 coded blocks. The conventional motion compensated padding methods fail to exploit the continuity of movement that can be traced by motions inside the picture or between successive pictures.

Disclosed herein are techniques that solve the above problems and some other problems not mentioned. For example, the techniques disclosed herein fill an extended area around a video unit with padding samples to generate a larger video unit. However, some of the padding samples (e.g., one or more of the padding samples) are generated without duplicating boundary samples within the video unit, instead of generating all of the padding samples using duplication/repetition. The techniques described herein should be considered as examples to explain the general concepts and should not be interpreted in a narrow way. Furthermore, these items can be applied individually or combined in any manner.

Figure 4:
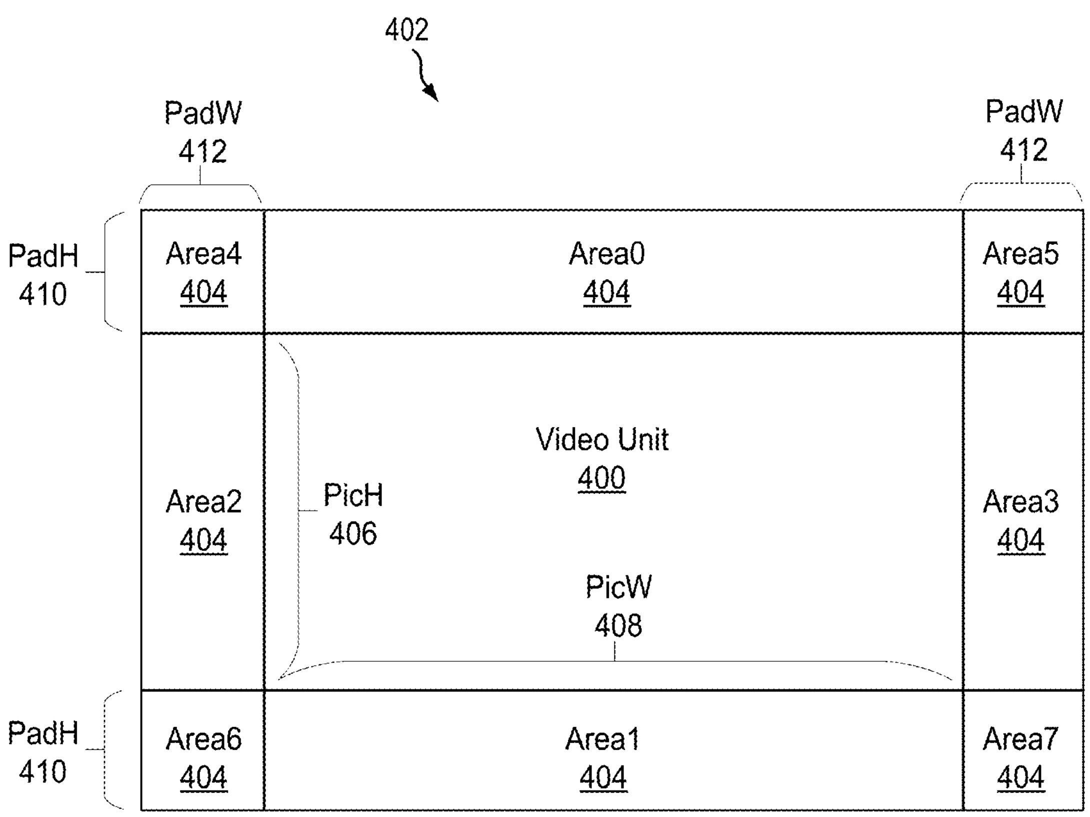
FIG. 4 is a schematic diagram of a video unit padded or expanded to a larger video unit using padding areas disposed around the video unit.

FIG. 4 is a schematic diagram of a video unit 400 (e.g., picture, slice, tile, sub-picture, reference picture, etc.) padded or expanded to a larger video unit 402 using padding areas 404 disposed around the video unit 400. The video unit 400 has a height 406 (PicH) and a width 408 (PicW). Each of the padding areas 404 has a horizontal padding dimension 410 (PadH) and a vertical padding dimension 412 (PadW). Thus, the larger video unit 402 has overall dimensions of (picW+2×padW)×(picH+2×padH). For purposes of discussion, the padding areas 404 have been labeled Area0, Area1, Area2, Area3, Area4, Area5, Area6, and Area1. The padding areas 404 labeled Area0, Area1, Area2, Area3 may be referred to herein as adjacent padding areas. In addition, the padding areas 404 labeled Area4, Area5, Area6, and Area1 may be referred to herein as corner padding areas.

In the present disclosure, the video unit (picW×picH) is padded to a bigger picture (picW+2×padW)×(picH+2×padH). PicW and picH denote the video unit (e.g., a picture) size in width and height dimensions, respectively. padW and padH denote the padding length of one side along with the width and height directions, respectively, as shown in FIG. 4.

Note that in the following descriptions, it is assumed the video unit is a picture. It is also assumed that only the picture picW×picH is coded to a compressed bitstream, while the padding area is generated at both the encoder and decoder side to form a larger reference picture for inter prediction of future pictures in the decoding order.

Figure 5:
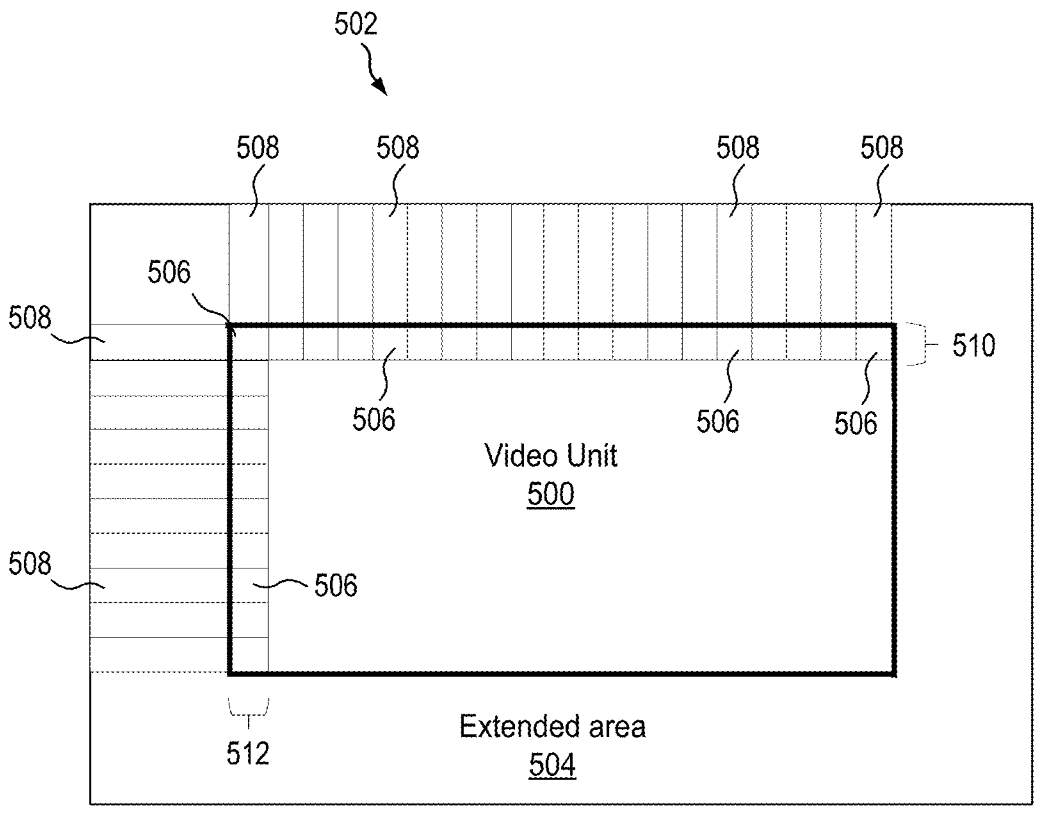
FIG. 5 is a schematic diagram of a video unit padded or expanded to a larger video unit using the extended area disposed around the video unit.

FIG. 5 is a schematic diagram of a video unit 500 padded or expanded to a larger video unit 502 using the extended area 504 disposed around the video unit 500. The video unit 500 and the larger video unit 502 of FIG. 5 are similar to the video unit 400 and the larger video unit 402 of FIG. 4, respectively. The extended area 504 in FIG. 5 is equivalent to a culmination of the padding areas 404 in FIG. 4.

As shown, the video unit 500 includes boundary samples 506 disposed within the video unit 500. The boundary samples 506 in the video unit 500 are considered to be corresponding to the padding samples 508 in the extended area 504 when the boundary samples 506 are adjacent to the padding samples 508 in the extended area 504. That is, a boundary sample 506 immediately adjacent to, or directly across from, a padding sample 508 in the extended area 504 is said to be corresponding to the padding sample 508.

The boundary samples 506 disposed at the top of the video unit 500 are considered to be in a top row 510. Likewise, the boundary samples 506 disposed at the left side of the video unit 500 are considered to be in a left column 512. In similar fashion, those skilled in the art will recognize that the boundary samples 506 disposed at the bottom of the video unit 500 (not shown) are considered to be in a bottom row (not shown) and the boundary samples 506 disposed at the right side of the video unit 500 (not shown) are considered to be in a right column (not shown). The boundary samples 506 at an intersection of a row and column (e.g., row 510 and column 512) may be referred to as corner boundary samples.

Like the boundary samples 506, the padding samples 508 may also be considered to be organized in rows and columns. For example, the padding sample 508 (or samples) at the top of Area 2 (see FIGS. 4-5) is considered to be in a top row 510. The padding sample 508 (or samples) at the far left of Area0 is considered to be in a left column 512.

The boundary samples 506 and the padding samples 508 in FIG. 5 may be referred to herein as boundary blocks/units and padding blocks/units, respectively. The extended area 508 in FIG. 5 is similar to a cumulation of the padding areas 404 in FIG. 4. In an embodiment, the boundary samples 506 are referred to as reconstructed samples or predicted samples and padding samples 508 are referred to as samples or luma samples.

From the foregoing, it should be appreciated that FIG. 5 depicts the relationship between the boundary samples 506, which are within the video unit 500, and the padding samples 508, which are outside the video unit 500.

Figure 6:
FIG. 6 is a method for coding video data according to an embodiment of the disclosure.

FIG. 6 is a method 600 for coding video data according to an embodiment of the disclosure. The method 600 may be performed by a video coding apparatus (e.g., an encoder or a decoder) having a processor and a memory. The method 600 may be implemented when determining how to fill an extended area around a video unit as part of a motion compensation process where inter prediction (a.k.a., motion compensated prediction) is utilized.

In block 602, the video coding apparatus fills an extended area (e.g., extended area 504) disposed around a video unit (e.g., video unit 500) with padding samples (padding samples 508) to generate a larger video unit (e.g., larger video unit 502). Some of the padding samples are generated without duplicating boundary samples (e.g., boundary samples 506) within the video unit. That is, some of the padding samples are obtained using a method or process other than duplication or repetition.

In block 604, the video coding apparatus converts between the video unit of the video and a bitstream (e.g., the bitstream 300) in accordance with the extended area as filled. When implemented in an encoder, converting includes receiving a video unit (e.g., a media file) and encoding the video unit and any corresponding parameters into a bitstream. When implemented in a decoder, converting includes receiving a bitstream including the video unit and any corresponding parameters and decoding the bitstream to obtain the video unit and any corresponding parameters.

1. In one example, the padding length such as padW and/or padH of a picture in one direction (e.g., along the left/right/above/bottom side of the picture) may be dependent on the CTU size, and/or inter interpolation filter length, and/or picture dimensions.

a. For example, the padding length padW and/or padH may be calculated based on ax (SIZE+offset), wherein a is an integer such as a=1, SIZE is an integer may or may not be dependent on the CTU width or height, offset is an integer may or may not be dependent on the interpolation filter length used in a video unit.

i. In one example, padW and/or padH may be in a form of padW=ax SIZE (or padH=ax SIZE). For example, padW and/or padH must be even numbers, or padW and/or padH must be in a form of axB where in B is a constant/variable.

b. For example, the value of padW and/or padH may be dependent on whether reference picture resampling (a.k.a. RPR) is applied and/or how large is the reference picture resampling factor.

c. Alternatively, the padding length padW and/or padH may be a predefined number such as 144, and etc.

d. For example, the padding length padW and/or padH may be dependent on whether there is a second padding method allowed in the codec.

i. Furthermore, the padding length padW and/or padH may be dependent on the allowed padding length of the second padding method.

e. For example, different padding lengths may be used for different pictures in a video bitstream.

i. Alternatively, one padding length is used for all pictures in a video bitstream.

ii. For example, different padding lengths may be used for different slice types (e.g., P or B slice), or different temporal layers.

iii. The padding length may be signaled from the encoder to decoder such as in SPS/PPS/picture header/slice header/CTU/CU.

f. For example, the padding length may depend on color components and/or color format.

g. For example, the padding length above the picture (e.g. padH for Area 0) and the padding length below the picture (e.g. padH for Area 1) may be different.

h. For example, the padding length left to the picture (e.g. padW for Area 2) and the padding length right to the picture (e.g. padW for Area 3) may be different.

2. In one example, if a second padding method (in addition to a first padding method such as repetitive padding) is allowed, the maximum allowed padding length of the second padding method may be different from the padding length of the first padding method.

a. For example, the maximum allowed padding length of the second padding method may be less than (or greater than) the padding length of the first padding method.

b. Alternatively, the maximum allowed padding length of the second padding method may be equal to the padding length of the first padding method.

c. Alternatively, the maximum allowed padding length of the second padding method may be equal to any value (e.g., no limitation).

d. For example, the maximum allowed padding length of the second padding method may be a predefined number such as 64, 144, 160, and etc.

e. For example, the maximum allowed padding length of the second padding method may be calculated based on a*(SIZE+offset), wherein a is an integer such as a=1, SIZE is an integer may or may not be dependent on the CTU width or height, offset is an integer may or may not be dependent on the interpolation filter length used in a video unit.

f. For example, the maximum allowed padding length of the second padding method may be dependent on whether reference picture resampling (a.k.a. RPR) is applied and/or how large is the reference picture resampling factor.

g. For example, whether a first or second padding method is used may be signalled using a syntax element in a video unit such as SPS/PPS/picture header/slice header/CTU/CU.

3. In one example, to fill the padding areas (e.g., Area0 . . . Area7 in FIG. 4) of a picture, it may be processed with a following procedure order:

a. For example, first pad areas {Area0, Area1, Area2, Area3} in a pre-defined order, then pad areas {Area4, Area5, Area6, Area1} in another pre-defined order.

b. For example, first pad areas {Area0, Area1, Area2, Area3} in any order, then pad areas {Area4, Area5, Area6, Area1} in any order.

c. For example, first pad areas Area4, Area5, Area6, Area7} in a pre-defined order, then pad areas {Area0, Area1, Area2, Area3} in another pre-defined order.

d. For example, first pad areas {Area4, Area5, Area6, Area1} in any order, then pad areas {Area0, Area1, Area2, Area3} in another pre-defined order.

e. In one example, a first padding area may be used to pad a second padding area, in case the first padding area is padded before the second padding area.

4. In one example, when padding areas at the corner parts of a bigger picture (e.g., as illustrated in FIG. 4, Area4 at the top-left corner, Area5 at the top-right corner, Area6 at the bottom-left corner, Area1 at the bottom-right corner), the samples are directly copied from the available boundary samples from either the current picture or the already padded areas.

a. For example, to fill the samples at the top-left corner such as Area4 of the bigger picture, the closest samples of the already padded area on the right such as Area0 may be copied. For example, the boundary samples located at the leftmost column of Area0 are duplicated to the left side and fill Area4.

i. Alternatively, the closest samples of the already padded area on the bottom such as Area2 may be copied. For example, the boundary samples located at the abovemost row of Area2 are duplicated to the above side and fill Area4.

ii. Alternatively, one or more reconstructed samples of the current picture may be copied. For example, the sample located at the top-left corner (i.e., the abovemost row and the leftmost column) of the current picture is duplicated to fill Area4.

b. For example, to fill the samples at the top-right corner such as Area5 of the bigger picture, the closest samples of the already padded area on the left such as Area0 may be copied. For example, the boundary samples located at the rightmost column of Area0 are duplicated to the right side and fill Area5.

i. Alternatively, the closest samples of the already padded area on the bottom such as Area3 may be copied. For example, the boundary samples located at the abovemost row of Area3 are duplicated to the above side and fill Area5.

ii. Alternatively, the reconstructed samples of the current picture may be copied. For example, the sample located at the top-right corner (i.e., the topmost row and the rightmost column) of the current picture is duplicated to fill Area5.

c. For example, to fill the samples at the bottom-left corner such as Area6 of the bigger picture, the closest samples of the already padded area on the right such as Area1 may be copied. For example, the boundary samples located at the leftmost column of Area1 are duplicated to the left side and fill Area6.

i. Alternatively, the closest samples of the already padded area on the above such as Area2 may be copied. For example, the boundary samples located at the bottommost row of Area2 are copied down and fill Area6.

ii. Alternatively, the reconstructed samples of the current picture may be copied. For example, the sample located at the bottom-left corner (i.e., the bottommost row and the leftmost column) of the current picture is duplicated to fill Area6.

d. For example, to fill the samples at the bottom-right corner such as Area1 of the bigger picture, the closest samples of the already padded area on the left such as Area1 may be copied. For example, the boundary samples located at the rightmost column of Area1 are duplicated to the right side and fill Area1.

i. Alternatively, the closest samples of the already padded area on the above such as Area3 may be copied. For example, the boundary samples located at the bottommost row of Area3 are duplicated down and fill Area1.

ii. Alternatively, the reconstructed samples of the current picture may be copied. For example, the sample located at the bottom-right corner (i.e., the bottommost row and the rightmost column) of the current picture is duplicated to fill Area1.

5. In one example, for a certain extended area to be padded (such as an area of Area0 . . . Area7 in FIG. 4), it may be filled in a way of M×N granularity, wherein M is the width of a padding unit/block in luma samples, and N is the height of a padding unit/block in luma samples.

a. For example, when filling the extended area directly to above and/or below of the picture (such as Area0 and/or Area1 in FIG. 4).

i. For example, M and/or N may be dependent on the size of the motion compression unit, such as 4×4, or 8×8, or 16×16 which is dependent on the type of codec.

ii. For example, M is not equal to N.

iii. For example, M may be a predefined number such as M=4, or 8, or 16, and etc.

iv. For example, M and/or N may be dependent on the predefined pad length such as padW and/or padH in FIG. 4.

b. For example, when filling the extended area directly to left and/or right of the picture (such as Area2 and/or Area3 in FIG. 4).

i. For example, N may be dependent on the size of the motion compression unit, such as 4×4, or 8×8, or 16×16 which is dependent on the type of codec.

ii. For example, M is not equal to N.

iii. For example, N is a predefined number such as N=4, or 8, or 16, and etc.

iv. For example, M may be dependent on the predefined pad length such as padW in FIG. 4.

c. For example, how to derive the padding samples for an M×N padding unit/block may be dependent on coding information of one or more boundary blocks/samples located inside a picture, wherein a boundary block indicates a block/sample located at the first row or last row or first column or last column of a picture.

i. For example, the size of boundary blocks used for picture boundary padding may be dependent on the dimensions of the padding unit/block such as M and/or N.

ii. For example, the size of boundary blocks used for picture boundary padding may be predefined.

iii. For example, the boundary block used for picture boundary padding may be just one or more samples located at the first row or last row or first column or last column of a picture.

d. For example, to fill the samples at the top side such as Area0 of the bigger picture, the samples are directly copied from the available boundary samples at the bottom of current picture.

e. For example, to fill the samples at the bottom side such as Area1 of the bigger picture, the samples are directly copied from the available boundary samples at the top of current picture.

f. For example, to fill the samples at the left side such as Area2 of the bigger picture, the samples are directly copied from the available boundary samples at the right of current picture.

g. For example, to fill the samples at the right side such as Area3 of the bigger picture, the samples are directly copied from the available boundary samples at the left of current picture.

6. In one example, how to derive the padding samples for an M×N padding unit/block may be dependent on motion information of one or more boundary blocks/samples located inside a picture, wherein a boundary block indicates a block/sample located at the first row or last row or first column or last column of a picture.

a. In one example, when deriving the padding samples, the motion vectors of one or more boundary blocks/samples located inside a picture are rounded to the integer pixel accuracy, where the integer motion vector may be its nearest integer motion vector.

b. In one example, when deriving the padding samples, N-tap interpolation filtering is used to get the reference samples at sub-pixel positions. For example, N may be 2, 4, 6, or 8.

7. In one example, the extended area of a picture may not be always filled with samples generated by duplicating boundary samples within the same picture.

a. For example, one or more (but not all) samples in the extended area may be directly copied from certain samples within the same picture.

b. For example, one or more samples in the extended areas may be predicted from predicted samples/interpolated samples in the same picture or a reference picture using a prediction method. In an embodiment, the predicted samples are samples in the video unit that have been reconstructed using a prediction process (e.g., inter prediction, intra prediction, etc.).

In an embodiment, the interpolated samples are samples in the video unit that have been reconstructed using an interpolation process. Interpolation techniques have been developed in order to improve the level of compression that can be achieved in inter-coding. The predictive data generated during motion compensation, which is used to code a video block, may be interpolated from the pixels of video blocks of the video frame or other coded unit used in motion estimation. Interpolation is often performed to generate predictive half pixel (half-pel) values and predictive quarter pixel (quarter-pel) values. The half- and quarter-pel values are associated with sub-pixel locations. Fractional motion vectors may be used to identify video blocks at the sub-pixel resolution in order to capture fractional movement in a video sequence, and thereby provide predictive blocks that are more similar to the video blocks being coded than the integer video blocks.

i. For example, the prediction method may refer to intra prediction, and/or inter prediction, and/or intra block copy (IBC) prediction, and/or palette coding, etc. Intra prediction, also known as intra-frame coding, is a data compression technique used within a video frame, enabling smaller file sizes and lower bitrates, with little or no loss in quality.

Since neighboring pixels within an image are often very similar, rather than storing each pixel independently, the frame image is divided into blocks and the typically minor difference between each pixel can be encoded using fewer bits.

Intra-frame prediction exploits spatial redundancy, i.e. correlation among pixels within one frame, by calculating prediction values through extrapolation from already coded pixels for effective delta coding. Intra-frame prediction is one of the two classes of predictive coding methods in video coding. Its counterpart is inter-frame prediction which exploits temporal redundancy.

Inter prediction, also known and inter-frame prediction, divides a frame into blocks. After that, instead of directly encoding the raw pixel values for each block, the encoder attempts to a block similar to the one the encoder is encoding in a previously encoded frame, referred to as a reference frame. This process is done by a block matching algorithm. When the encoder succeeds on its search, the block can be encoded by a vector, known as motion vector, which points to the position of the matching block in the reference frame. The process of motion vector determination is called motion estimation.

Intra block copy allows for the prediction of a given intra coded block to be a copy of another intra coded block in the same frame (i.e., from the reconstructed part of the current frame). Palette coding, or palette mode, is a coding tool included in the HEVC screen content coding extension (SCC) to improve the coding efficiency for screen contents such as computer generated video with substantial amount of text and graphics.

c. For example, some samples in the extended areas may be derived from certain samples in the already padded extended areas. That is, some of the padding samples in the extended area are derived from other padding samples already added to the extended area.

8. In one example, how to generate the extended samples of a picture may be dependent on the coded information (e.g., prediction mode such as MODE_INTRA, MODE_INTER, MODE_IBC, etc.) of boundary blocks/samples within the same picture or in a reference picture.

a. In one example, one or more samples of extended areas of a picture may be derived from predicted samples generated by a block vector of an IBC coded block. A block vector is similar to a motion vector, as described above, except that the block vector points to a block in the same video unit instead of pointing to a block in a reference video unit (e.g., a reference picture encoded before or after the current picture).

i. For example, one or more samples in the extended area of a picture may be generated from predicted/interpolated samples based on certain samples within the same picture, wherein the predictor may be identified by a block vector of an IBC coded boundary block, wherein the interpolation filter for deriving the predicted samples may be a DigiCipher II filter (DCIIF), gaussian filter, N-tap filter (where N is an integer), etc.

ii. In another example, how to find the predicted samples may be dependent on block vectors of one or more IBC coded boundary blocks, wherein the block vector may be the original block vector, or a modified block vector such as just one dimension of the original block vector or a clipped block vector, or a weighted block vector from more than one adjacent/non-adjacent block vectors, or a shifted block vector calculated by adding up a delta vector to the original block vector. In an embodiment, a clipping operation is performed to obtain the clipped block vector. The operation may be used to prevent a reference block from overlapping a coding tree block that is not available.

b. In one example, one or more samples in the extended area of a picture may be filled with predicted samples generated by applying angular prediction to certain samples within the same picture. Angular prediction is a copying-based process which assumes visual content follows a pure direction of propagation. For example, there are thirty-three angular prediction modes available for intra prediction.

i. For example, how to generate the extended area of a picture may be dependent on the intra angular mode of the boundary blocks within the same picture.

a) For example, a pre-defined angular mode (e.g., horizontal or vertical mode) may be used when the intra prediction modes of the boundary blocks are not angular modes (e.g., Planar or direct current (DC)), or the boundary blocks are not coded using angular prediction.

ii. For example, how to generate the extended area of a picture may be dependent on the estimated edge direction (e.g., derived from edge detection or gradient calculation) of the boundary blocks within the same picture.

iii. In one example, an extended sample may be predicted with angular prediction by samples which are right of or below the extended sample.

iv. In one example, Position Dependent Prediction Combination (PDPC) may be used to refine the predicted extended samples.

v. In one example, the extended samples may be predicted by matrix intra prediction (MIP).

c. In one example, one or more samples in the extended area of a picture may be filled with predicted samples in its reference pictures generated by motion compensation using inter prediction.

i. For example, one or more samples in the extended area of a picture may be generated from predicted/interpolated samples in reference pictures, wherein the predictor may be identified by one or more motion vectors of inter coded blocks, wherein the interpolation filter for deriving the predicted samples may be DCIIF, gaussian filter, N-tap filter (where N is an integer), and etc.

ii. For example, how to find the predicted samples may be dependent on motion vectors of the boundary blocks inside the current picture, wherein the motion vector may be the original motion vector, or a modified motion vector such as just one dimension of the original motion vector or a clipped motion vector, or a weighted motion vector from more than two adjacent motion vectors, or a shifted motion vector calculated by adding up a delta vector to the original motion vector.

d. In one example, only if the boundary block inside the current picture is coded by a predefined prediction modes, the corresponding padding block/samples in the extended area of the current picture may be generated by motion-compensated prediction other than duplicate/repetitive padding.

i. For example, only if the boundary block inside the current picture is coded by inter prediction mode, the corresponding padding block/samples in the extended area of the current picture may be generated by motion-compensated prediction (e.g., inter prediction) other than duplicate/repetitive padding. Motion-compensated prediction (MCP) can be used to decrease the number of necessary bits needed for quantization by encoding the error of predicted motion in the current frame.

ii. For example, if the boundary block inside the current picture is IBC-coded, the corresponding padding block/ samples in the extended area of the current picture is generated by duplicate/repetitive padding.

iii. For example, if the boundary block inside the current picture is intra-coded, the corresponding padding block/samples in the extended area of the current picture is generated by duplicate/repetitive padding.

iv. For example, if the boundary block inside the current picture is coded using palette coding mode, the corresponding padding block/samples in the extended area of the current picture is generated by duplicate/repetitive padding.

v. Alternatively, only if the boundary inside the current picture is coded by inter prediction mode or IBC prediction mode, the corresponding padding block/samples in the extended area of the current picture may be generated by motion-compensated prediction other than duplicate/repetitive padding.

9. In one example, given an inter-coded boundary block of the current picture, its adjacent padding unit/block may be filled with padded samples generated from multiple prediction blocks.

a. For example, some of the padded samples may be generated by blending more than one prediction block in the reference pictures, wherein the number of prediction blocks may be dependent on the motion data of the boundary block and/or the motion data of reference blocks in the reference picture of the boundary block. In an embodiment, both the uni- and bi-prediction modes can weigh the reference pictures to be combined using weighted prediction, where a weight and an offset are applied to the motion compensated blocks to fade or blend the predictions.

b. For example, whether to generate padded samples from one prediction or multiple predictions may be dependent on whether the prediction samples derived from a prediction block are inside or outside the reference picture (or the extended area of the reference picture).

c. For example, if the boundary block is predicted from bi-prediction, only one of two prediction blocks may be selected to generate the padded samples.

i. For example, the selection may be based on a rule of cost measurement (such as the total sample difference between a specific prediction block and the current block).

ii. For example, the selection may be based on the magnitudes of horizontal or vertical components of motion vectors of boundary blocks and/or reference blocks.

d. For example, if a reference block of the boundary block is inter-coded, the motion data of the reference block may be also exploited to generate the padded samples for the current picture.

i. For example, the motion vector of the reference block may be scaled to the reference picture of the boundary block, and a prediction block derived from the scaled motion vector may be used to generate the padded samples for the current picture.

ii. For example, the motion vector of the reference block may be not scaled, and a prediction block in the reference picture of the reference block may be used to generate the padded samples of the current picture.

e. For example, more than one prediction block may be exploited to generate the padded samples, wherein more than one prediction block may be weighted to generate a final prediction block, wherein the weighting factors for a specific prediction block/sample may be dependent on the picture order count (POC) distance between reference picture and the current picture, and etc.

f. In one example, a padded sample S may be generated as a weighted sum of n prediction samples $P_k$, as $$S = \sum_{k=0}^{n-1} W_k \times P_k,$$

where W represents the weights and k represents the number of prediction samples.

i. In one example, $P_k$ may be generated by inter-prediction.

ii. In one example, $P_k$ may be generated by intra-prediction.

iii. In one example, $P_k$ may be generated by IBC prediction.

iv. In one example, $P_k$ may be generated by inter-prediction with $MV_k$, $P_j$ may be generated by inter-prediction with $MV_j$, and $MV_k$ may be different from MVS.

a) In one example, $MV_j$ and $MV_k$ may be obtained from different blocks.

b) In one example, $MV_k$ or $MV_j$ may be obtained from a neighboring padded block.

c) In one example, $MV_k$ or $MV_j$ may be obtained from a corresponding block inside the picture.

v. In one example, $$\sum_{k=0}^{n-1} W_k = 0.$$

a) In one example, the weighting values may be dependent on the position of S.

10. In one example, what motion vector is used to generate the padded samples may be dependent on a motion model.

A. For example, a synthesized motion vector may be generated from multiple motion vectors of multiple adjacent coding blocks inside the current picture. For example, suppose there are N motion vector candidates constructing from multiple adjacent coding blocks, the synthesized motion vector may be computed as $(a_0 \times MV\mathbf{0} + a_1 + a_2 \times MV\mathbf{2} + \ldots a_n \times MVn + offset) >>> \log 2(N)$, wherein $a_0$, $a_1$, $a_2$, . . . , $a_n$ are scaling factors, and offset is a constant value. In another example, the synthesized motion vector may be computed as $(a_0 \times MV\mathbf{0} + a_1 \times MV\mathbf{1} + a_2 \times MV\mathbf{2} + \ldots a_n \times MVn$, wherein the sum of $a_0$, $a_1$, $a_2$, . . . , $a_n$ is equal to 1.

B. For example, a motion trajectory may be built from multiple motion vectors of multiple adjacent coding blocks inside the current picture. The motion vector for padded samples may be projected regarding the consistency of the motion trajectory.

11. In one example, how to generate the padded samples may be dependent on whether the boundary block is affine coded or not. Affine coding is performed using an affine model that uses a geometric transformation that preserves lines and parallelism. Affine coding allows for rotation, resizing, shearing, or a combination thereof in performing prediction.

a. For example, if one or more boundary blocks are predicted by affine model, projected motion vectors of padded blocks in a padded unit may be calculated from the motion vectors of affine coded boundary blocks. For example, different projected motion vectors may be calculated for 4×4 padded subblocks in a padded unit/block.

b. In one example, the MV for a padded subblock may be derived with the affine model.

i. In one example, MVs of neighbouring blocks inside the picture adjacent to or non-adjacent to the padded block may be used as control point motion vectors (CPMVs) in the affine model to derive the MV for the padded subblock.

12. In one example, how to generate the padded samples may be dependent on whether the boundary block is Bi-prediction with CU-level weights (BCW) coded or not.

a. For example, the derivation of weighted factors used for generating a padded block from more than one prediction block, may be dependent on the BCW index and/or the weighting factors of an adjacent boundary block.

13. In one example, how to generate the padded samples may be dependent on whether the boundary block is half-pel interpolation coded or not. As used herein, a pel may also be referred to as a pixel (e.g., a sample).

a. For example, different interpolation filters may be used to generate the motion compensated padding samples, e.g., if the adjacent boundary block is coded with a half-pel interpolation filter, N-tap filter (such as N=6) is used to generate prediction samples for constructing a padded block. Otherwise, M-tap filter (such as M=8) is used.

b. For example, same interpolation filter may be used to generate all motion compensated padded samples of a padding area.

14. In one example, how to generate the padded samples may be dependent on whether the boundary block is combined inter-intra prediction (CIIP) coded or not.

15. In one example, how to generate the padded samples may be dependent on whether the boundary block is geometric partitioning mode (GPM) coded or not.

16. In one example, whether to and/or how to apply the methods disclosed above may depend on color components and/or color format. Color space and chroma sub sampling are discussed. Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB. Y'CbCr, or Y Pb/Cb Pr/Cr, also written as $YC_BC_R$ or $Y'C_BC_R$, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

For 4:4:4: chroma subsampling, each of the three Y'CbCr components have the same sample rate, thus there is no chroma subsampling. This scheme is sometimes used in high-end film scanners and cinematic post production.

For 4:2:2 chroma subsampling, the two chroma components are sampled at half the sample rate of luma: the horizontal chroma resolution is halved. This reduces the bandwidth of an uncompressed video signal by one-third with little to no visual difference.

For 4:2:0 chroma subsampling, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of two both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially). In Joint Photographic Experts Group (JPEG)/JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

17. In one example, whether to and/or how to apply the methods disclosed above may be signaled to the decoder such as in SPS/PPS/picture header/slice header/CTU/CU.

18. The padding method and/or padding size and/or how to generate the padded samples for different boundaries (e.g., top, left, right, bottom) may be different.

Figure 7:
FIG. 7 is a schematic diagram of an encoder.
Figure 7:
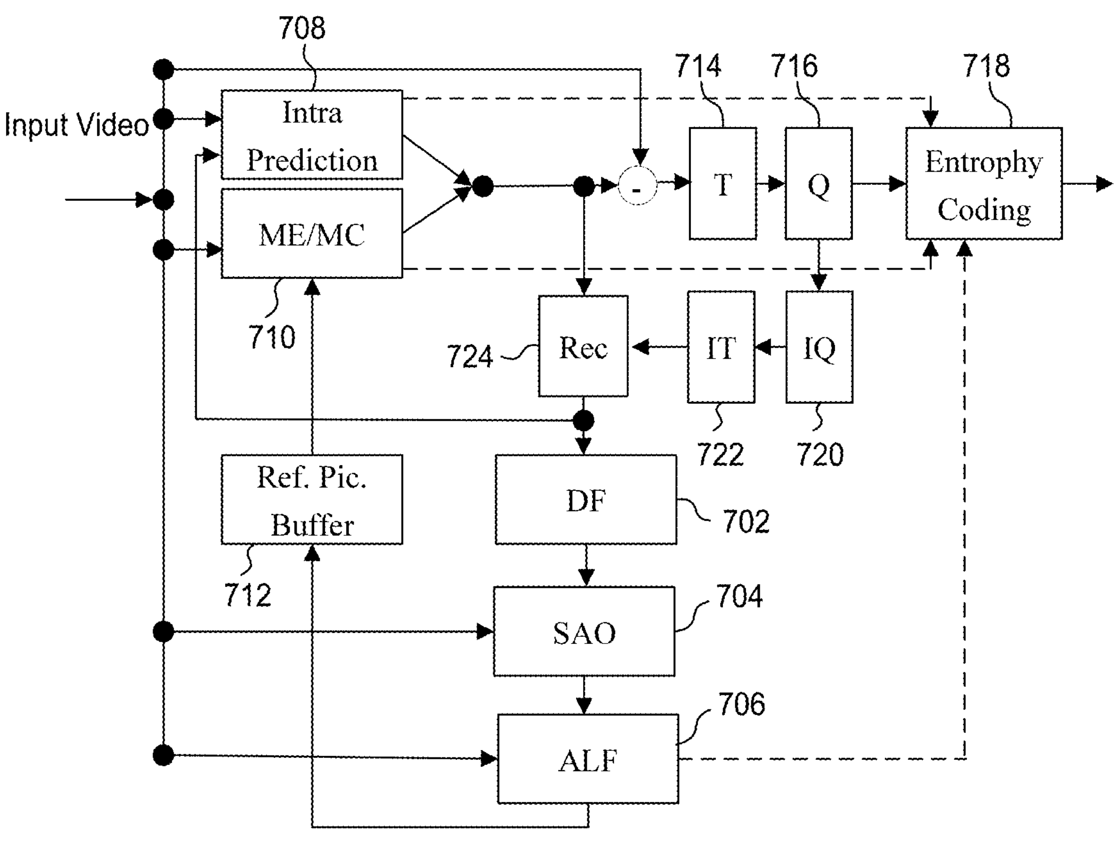

FIG. 7 is a schematic diagram of an encoder 700. The encoder 700 is suitable for implementing the techniques of VVC. The encoder 700 includes three in-loop filters, namely a deblocking filter (DF) 702, a sample adaptive offset (SAO) 704, and an adaptive loop filter (ALF) 706. Unlike the DF 702, which uses predefined filters, the SAO 704 and the ALF 706 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 706 is located at the last processing stage of each picture and can be regarded as a tool trying to catch and fix artifacts created by the previous stages.

The encoder 700 further includes an intra prediction component 708 and a motion estimation/compensation (ME/MC) component 710 configured to receive input video. The intra prediction component 708 is configured to perform intra prediction, while the ME/MC component 710 is configured to utilize reference pictures obtained from a reference picture buffer 712 to perform inter prediction. Residual blocks from inter prediction or intra prediction are fed into a transform component 714 and a quantization component 716 to generate quantized residual transform coefficients, which are fed into an entropy coding component 718. The entropy coding component 718 entropy codes the prediction results and the quantized transform coefficients and transmits the same toward a video decoder (not shown). Quantization components output from the quantization component 716 may be fed into an inverse quantization component 720, an inverse transform component 722, and a reconstruction (REC) component 724. The REC component 724 is able to output images to the DF 702, the SAO 704, and the ALF 706 for filtering prior to those images being stored in the reference picture buffer 712.

The input of the DF 702 is the reconstructed samples before in-loop filters. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 8:
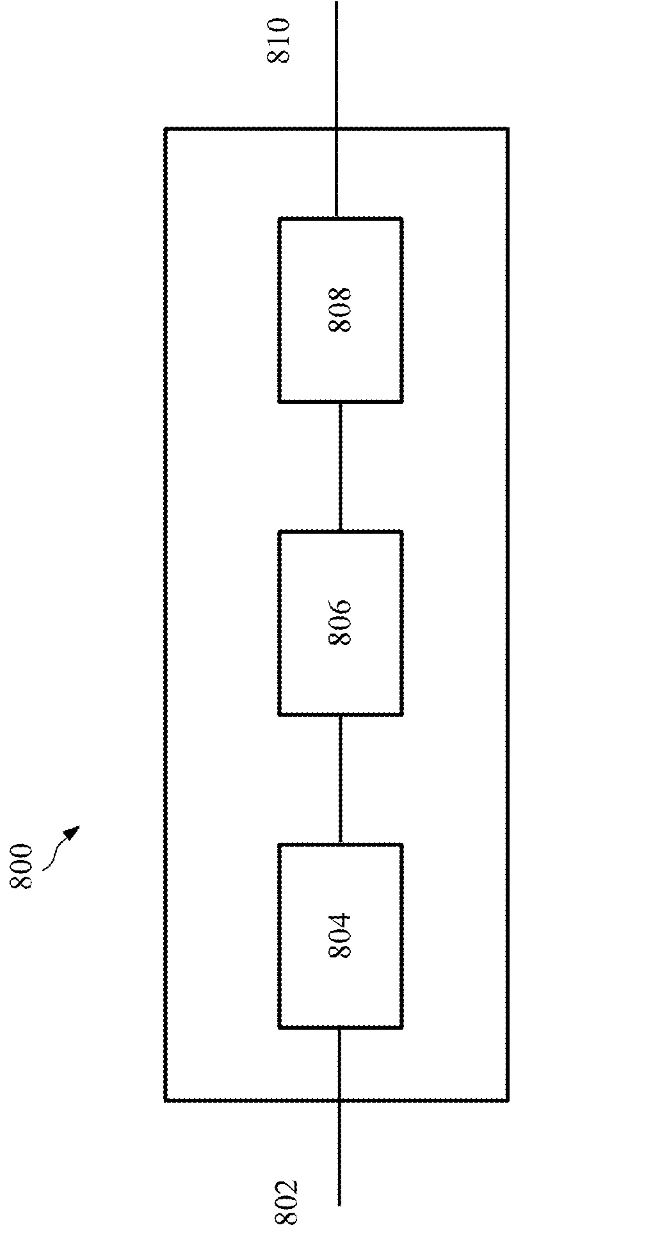
FIG. 8 is a block diagram showing an example video processing system.

FIG. 8 is a block diagram showing an example video processing system 800 in which various techniques disclosed herein may be implemented. Various implementations may include some or all of the components of the video processing system 800. The video processing system 800 may include input 802 for receiving video content. The video content may be received in a raw or uncompressed format, e.g., 8 or 10 bit multi-component pixel values, or may be in a compressed or encoded format. The input 802 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 800 may include a coding component 804 that may implement the various coding or encoding methods described in the present document. The coding component 804 may reduce the average bitrate of video from the input 802 to the output of the coding component 804 to produce a coded representation of the video. The coding techniques are therefore sometimes called video compression or video transcoding techniques. The output of the coding component 804 may be either stored, or transmitted via a communication connected, as represented by the component 806. The stored or communicated bitstream (or coded) representation of the video received at the input 802 may be used by the component 808 for generating pixel values or displayable video that is sent to a display interface 810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 9:
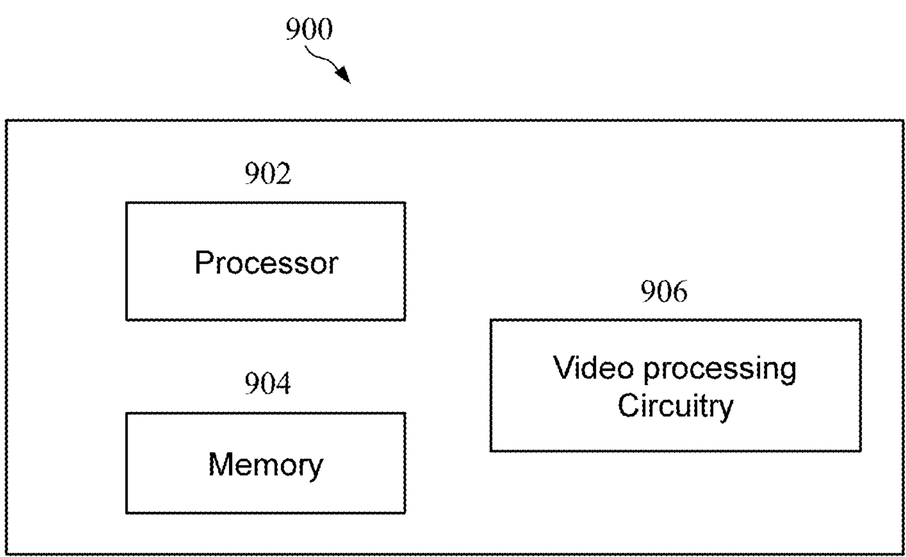
FIG. 9 is a block diagram of a video processing apparatus.

FIG. 9 is a block diagram of a video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods described in the present document. The memory (memories) 904 may be used for storing data and code used for implementing the methods and techniques described herein. The video processing hardware 906 may be used to implement, in hardware circuitry, some techniques described in the present document. In some embodiments, the hardware 906 may be partly or completely located within the processor 902, e.g., a graphics processor.

Figure 10:
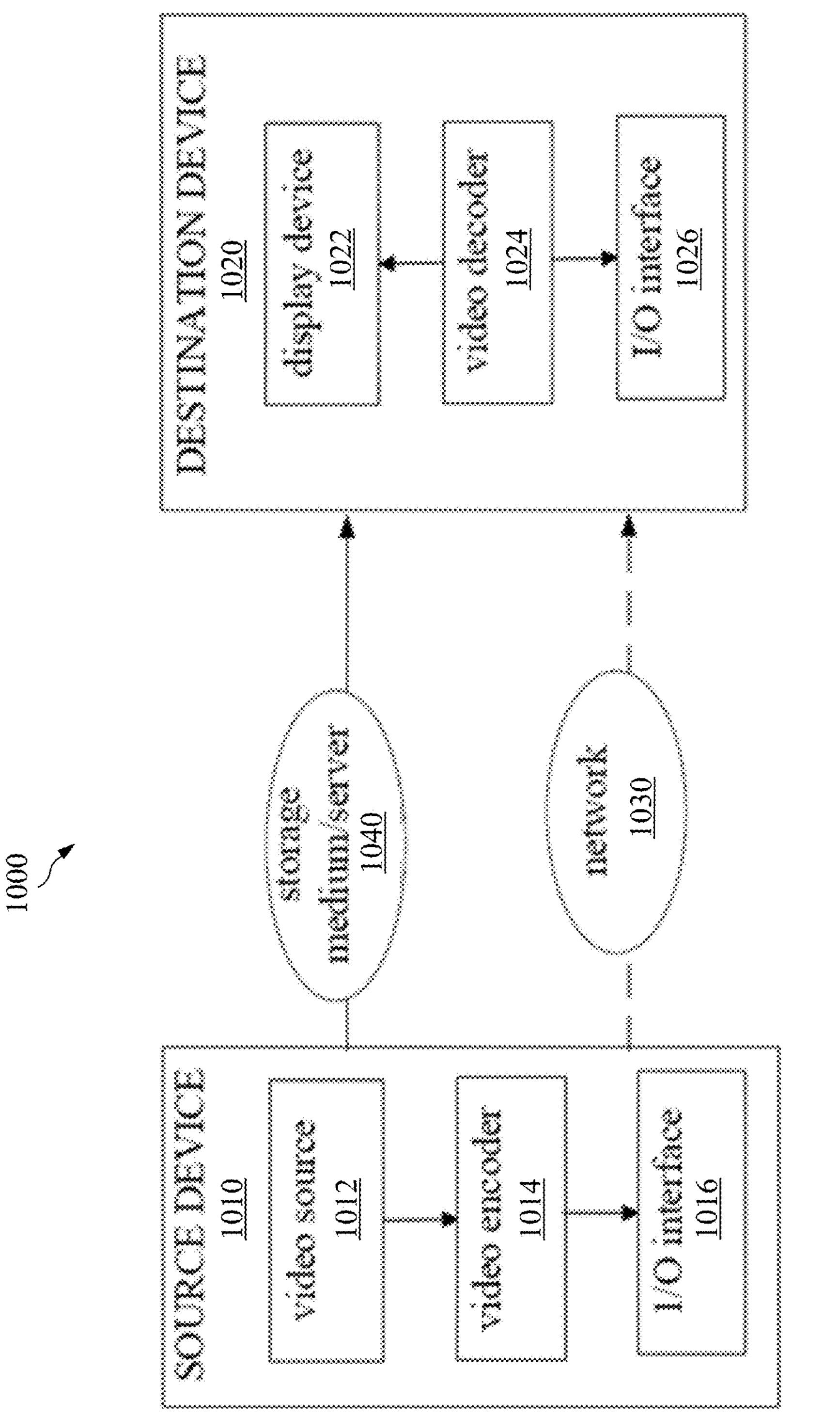
FIG. 10 is a block diagram that illustrates an example video coding system.

FIG. 10 is a block diagram that illustrates an example video coding system 1000 that may utilize the techniques of this disclosure. As shown in FIG. 10, the video coding system 1000 may include a source device 1010 and a destination device 1020. Source device 1010 generates encoded video data which may be referred to as a video encoding device. Destination device 1020 may decode the encoded video data generated by source device 1010 which may be referred to as a video decoding device.

Source device 1010 may include a video source 1012, a video encoder 1014, and an input/output (I/O) interface 1016.

Video source 1012 may include a source such as a video capture device, an interface to receive video data from a video content provider, and/or a computer graphics system for generating video data, or a combination of such sources. The video data may comprise one or more pictures. Video encoder 1014 encodes the video data from video source 1012 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1016 may include a modulator/demodulator (modem) and/or a transmitter. The encoded video data may be transmitted directly to destination device 1020 via I/O interface 1016 through network 1030. The encoded video data may also be stored onto a storage medium/server 1040 for access by destination device 1020.

Destination device 1020 may include an I/O interface 1026, a video decoder 1024, and a display device 1022.

I/O interface 1026 may include a receiver and/or a modem. I/O interface 1026 may acquire encoded video data from the source device 1010 or the storage medium/server 1040. Video decoder 1024 may decode the encoded video data. Display device 1022 may display the decoded video data to a user. Display device 1022 may be integrated with the destination device 1020, or may be external to destination device 1020 which may be configured to interface with an external display device.

Video encoder 1014 and video decoder 1024 may operate according to a video compression standard, such as the High Efficiency Video Coding (HEVC) standard, Versatile Video Coding (VVC) standard, and other current and/or further standards.

Figure 11:
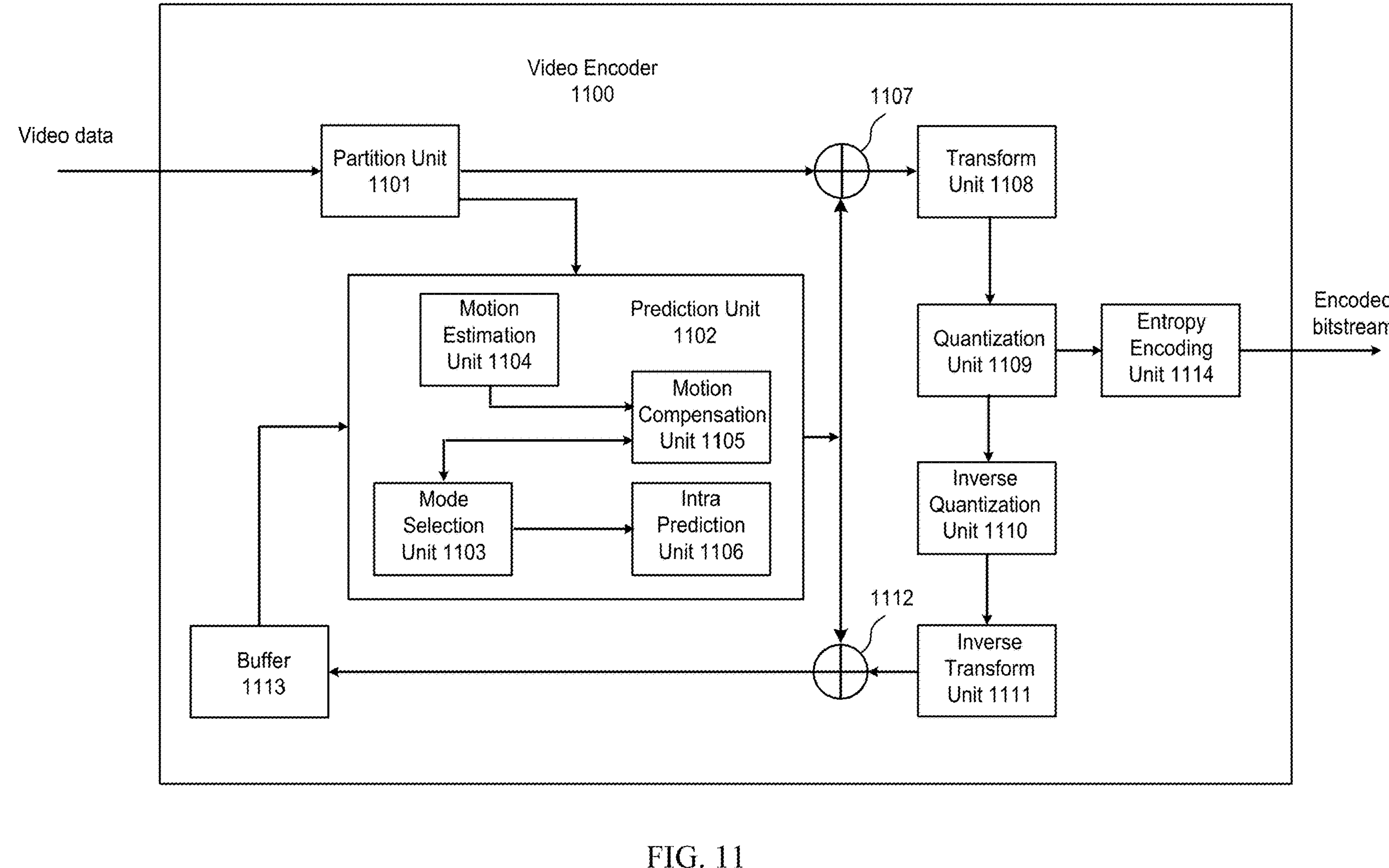
FIG. 11 is a block diagram illustrating an example of video encoder.

FIG. 11 is a block diagram illustrating an example of video encoder 1100, which may be video encoder 1014 in the video coding system 1000 illustrated in FIG. 10.

Video encoder 1100 may be configured to perform any or all of the techniques of this disclosure. In the example of FIG. 11, video encoder 1100 includes a plurality of functional components. The techniques described in this disclosure may be shared among the various components of video encoder 1100. In some examples, a processor may be configured to perform any or all of the techniques described in this disclosure.

The functional components of video encoder 1100 may include a partition unit 1101, a prediction unit 1102 which may include a mode selection unit 1103, a motion estimation unit 1104, a motion compensation unit 1105, an intra prediction unit 1106, a residual generation unit 1107, a transform unit 1108, a quantization unit 1109, an inverse quantization unit 1110, an inverse transform unit 1111, a reconstruction unit 1112, a buffer 1113, and an entropy encoding unit 1114.

In other examples, video encoder 1100 may include more, fewer, or different functional components. In an example, prediction unit 1102 may include an intra block copy (IBC) unit. The IBC unit may perform prediction in an IBC mode in which at least one reference picture is a picture where the current video block is located.

Furthermore, some components, such as motion estimation unit 1104 and motion compensation unit 1105 may be highly integrated, but are represented in the example of FIG. 11 separately for purposes of explanation.

Partition unit 1101 may partition a picture into one or more video blocks. Video encoder 1014 and video decoder 1024 of FIG. 10 may support various video block sizes.

Mode selection unit 1103 may select one of the coding modes, intra or inter, e.g., based on error results, and provide the resulting intra- or inter-coded block to a residual generation unit 1107 to generate residual block data and to a reconstruction unit 1112 to reconstruct the encoded block for use as a reference picture. In some examples, mode selection unit 1103 may select a combination of intra and inter prediction (CIIP) mode in which the prediction is based on an inter prediction signal and an intra prediction signal. Mode selection unit 1103 may also select a resolution for a motion vector (e.g., a sub-pixel or integer pixel precision) for the block in the case of inter-prediction.

To perform inter prediction on a current video block, motion estimation unit 1104 may generate motion information for the current video block by comparing one or more reference frames from buffer 1113 to the current video block. Motion compensation unit 1105 may determine a predicted video block for the current video block based on the motion information and decoded samples of pictures from buffer 1113 other than the picture associated with the current video block.

Motion estimation unit 1104 and motion compensation unit 1105 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 1104 may perform uni-directional prediction for the current video block, and motion estimation unit 1104 may search reference pictures of list 0 or list 1 for a reference video block for the current video block. Motion estimation unit 1104 may then generate a reference index that indicates the reference picture in list 0 or list 1 that contains the reference video block and a motion vector that indicates a spatial displacement between the current video block and the reference video block. Motion estimation unit 1104 may output the reference index, a prediction direction indicator, and the motion vector as the motion information of the current video block. Motion compensation unit 1105 may generate the predicted video block of the current block based on the reference video block indicated by the motion information of the current video block.

In other examples, motion estimation unit 1104 may perform bi-directional prediction for the current video block, motion estimation unit 1104 may search the reference pictures in list for a reference video block for the current video block and may also search the reference pictures in list 1 for another reference video block for the current video block. Motion estimation unit 1104 may then generate reference indexes that indicate the reference pictures in list 0 and list 1 containing the reference video blocks and motion vectors that indicate spatial displacements between the reference video blocks and the current video block. Motion estimation unit 1104 may output the reference indexes and the motion vectors of the current video block as the motion information of the current video block. Motion compensation unit 1105 may generate the predicted video block of the current video block based on the reference video blocks indicated by the motion information of the current video block.

In some examples, motion estimation unit 1104 may output a full set of motion information for decoding processing of a decoder.

In some examples, motion estimation unit 1104 may not output a full set of motion information for the current video. Rather, motion estimation unit 1104 may signal the motion information of the current video block with reference to the motion information of another video block. For example, motion estimation unit 1104 may determine that the motion information of the current video block is sufficiently similar to the motion information of a neighboring video block.

In one example, motion estimation unit 1104 may indicate, in a syntax structure associated with the current video block, a value that indicates to the video decoder 1024 that the current video block has the same motion information as another video block.

In another example, motion estimation unit 1104 may identify, in a syntax structure associated with the current video block, another video block and a motion vector difference (MVD). The motion vector difference indicates a difference between the motion vector of the current video block and the motion vector of the indicated video block. The video decoder 1024 may use the motion vector of the indicated video block and the motion vector difference to determine the motion vector of the current video block.

As discussed above, video encoder 1014 may predictively signal the motion vector. Two examples of predictive signaling techniques that may be implemented by video encoder 1014 include advanced motion vector prediction (AMVP) and merge mode signaling.

Intra prediction unit 1106 may perform intra prediction on the current video block. When intra prediction unit 1106 performs intra prediction on the current video block, intra prediction unit 1106 may generate prediction data for the current video block based on decoded samples of other video blocks in the same picture. The prediction data for the current video block may include a predicted video block and various syntax elements.

Residual generation unit 1107 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 1107 may not perform the subtracting operation.

Transform unit 1108 may generate one or more transform coefficient video blocks for the current video block by applying one or more transforms to a residual video block associated with the current video block.

After transform unit 1108 generates a transform coefficient video block associated with the current video block, quantization unit 1109 may quantize the transform coefficient video block associated with the current video block based on one or more quantization parameter (QP) values associated with the current video block.

Inverse quantization unit 1110 and inverse transform unit 1111 may apply inverse quantization and inverse transforms to the transform coefficient video block, respectively, to reconstruct a residual video block from the transform coefficient video block. Reconstruction unit 1112 may add the reconstructed residual video block to corresponding samples from one or more predicted video blocks generated by the prediction unit 1102 to produce a reconstructed video block associated with the current block for storage in the buffer 1113.

After reconstruction unit 1112 reconstructs the video block, loop filtering operation may be performed to reduce video blocking artifacts in the video block.

Entropy encoding unit 1114 may receive data from other functional components of the video encoder 1100. When entropy encoding unit 1114 receives the data, entropy encoding unit 1114 may perform one or more entropy encoding operations to generate entropy encoded data and output a bitstream that includes the entropy encoded data.

Figure 12:
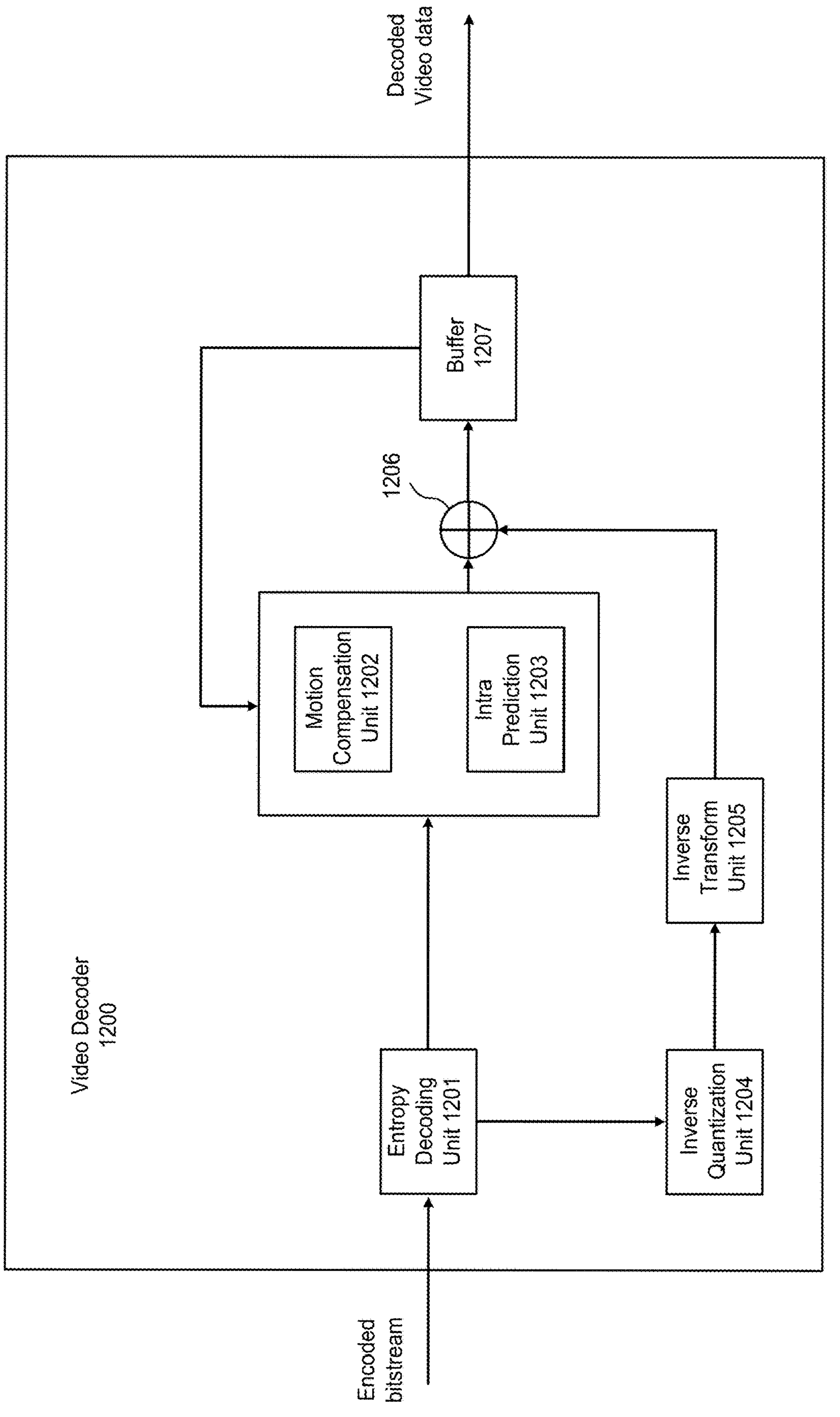
FIG. 12 is a block diagram illustrating an example of video decoder.

FIG. 12 is a block diagram illustrating an example of video decoder 1200, which may be video decoder 1024 in the video coding system 1000 illustrated in FIG. 10.

The video decoder 1200 may be configured to perform any or all of the techniques of this disclosure. In the example of FIG. 12, the video decoder 1200 includes a plurality of functional components. The techniques described in this disclosure may be shared among the various components of the video decoder 1200. In some examples, a processor may be configured to perform any or all of the techniques described in this disclosure.

In the example of FIG. 12, video decoder 1200 includes an entropy decoding unit 1201, a motion compensation unit 1202, an intra prediction unit 1203, an inverse quantization unit 1204, an inverse transformation unit 1205, a reconstruction unit 1206, and a buffer 1207. Video decoder 1200 may, in some examples, perform a decoding pass generally reciprocal to the encoding pass described with respect to video encoder 1014 (FIG. 10).

Entropy decoding unit 1201 may retrieve an encoded bitstream. The encoded bitstream may include entropy coded video data (e.g., encoded blocks of video data). Entropy decoding unit 1201 may decode the entropy coded video data, and from the entropy decoded video data, motion compensation unit 1202 may determine motion information including motion vectors, motion vector precision, reference picture list indexes, and other motion information. Motion compensation unit 1202 may, for example, determine such information by performing the AMVP and merge mode signaling.

Motion compensation unit 1202 may produce motion compensated blocks, possibly performing interpolation based on interpolation filters. Identifiers for interpolation filters to be used with sub-pixel precision may be included in the syntax elements.

Motion compensation unit 1202 may use interpolation filters as used by video encoder 1014 during encoding of the video block to calculate interpolated values for sub-integer pixels of a reference block. Motion compensation unit 1202 may determine the interpolation filters used by video encoder 1014 according to received syntax information and use the interpolation filters to produce predictive blocks.

Motion compensation unit 1202 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 1203 may use intra prediction modes for example received in the bitstream to form a prediction block from spatially adjacent blocks. Inverse quantization unit 1204 inverse quantizes, i.e., de-quantizes, the quantized video block coefficients provided in the bitstream and decoded by entropy decoding unit 1201. Inverse transform unit 1205 applies an inverse transform.

Reconstruction unit 1206 may sum the residual blocks with the corresponding prediction blocks generated by motion compensation unit 1202 or intra-prediction unit 1203 to form decoded blocks. If desired, a deblocking filter may also be applied to filter the decoded blocks in order to remove blockiness artifacts. The decoded video blocks are then stored in buffer 1207, which provides reference blocks for subsequent motion compensation/intra prediction and also produces decoded video for presentation on a display device.

A listing of solutions preferred by some embodiments is provided next.

The following solutions show example embodiments of techniques discussed in the present disclosure.

The following solutions show example embodiments of techniques discussed in the previous section (e.g., item 1, above).

1. A method of video processing, comprising: determining, for a conversion between a video unit of a video and a bitstream of the video, to pad samples of the video unit; and performing the conversion based on the determining; wherein, the padded samples of the video unit are generated according to a rule, wherein the rule specifies that at least some padded samples are generated without duplicating boundary samples of the video unit.

2. The method of solution 1, wherein the rule specifies that padded samples are generated by copying from samples inside the video unit.

3. The method of solution 1, wherein the rule specifies that padded samples are predicted from predicted or interpolated samples inside the video unit.

4. The method of solution 1, wherein the rule specifies that padded samples are generated from other previously generated padded samples.

The following solutions show example embodiments of techniques discussed in the previous section.

5. The method of any of solutions 1-4, wherein the rule specifies that a manner by which the padded samples are generated is responsive to a coded information of the video unit.

6. The method of solution 5, wherein the coded information comprises a prediction mode of a boundary block or samples in the video unit or in a reference picture of the video unit.

7. The method of solution 6, wherein the padded samples are generated using an intra block copy or inter prediction or an angular prediction of samples in the video unit. The following solutions show example embodiments of techniques discussed in the previous section.

8. The method of solution 1, wherein the rule specifies that padded samples adjacent to an inter-coded boundary block of the video unit are generated from N prediction blocks, where N is an integer.

9. The method of solution 8, wherein the N prediction blocks are blended.

10. The method of solution 8, wherein N is responsive to whether the inter-coded boundary block is predicted from a reference picture block that is inside or outside the reference picture.

The following solutions show example embodiments of techniques discussed in the previous section.

11. The method of solution 1, wherein the rule specifies that the padded samples are generated using a motion vector, and wherein the motion vector is responsive to a motion model.

12. The method of solution 11, wherein the motion vector used for generating the padded samples is generated from multiple motion vectors of multiple adjacent blocks inside the video unit.

13. The method of solution 11, wherein the motion vector is generated by building a motion trajectory from multiple motion vectors of multiple adjacent blocks inside the video unit.

The following solutions show example embodiments of techniques discussed in the previous section.

14. The method of solution 1, wherein the rule specifies that a manner of generating the padded samples is responsive to whether a boundary block is affine coded.

15. The method of solution 14, wherein the rule specifies that, in case that one or more boundary blocks are predicted by an affine model, then the padded samples are generated using motion vectors of the one or more boundary blocks.

16. The method of solution 14, wherein the rule specifies an affine model used for the generating the padded samples.

The following solutions show example embodiments of techniques discussed in the previous section.

17. The method of solution 1, wherein the rule specifies that a manner of the generating the padded samples is responsive to whether a boundary block of the video unit coded using a bi-prediction with coding unit level weights (BCW) coding.

18. The method of solution 17, wherein the rule specifies that the manner is dependent on an index of the BCW coding.

The following solutions show example embodiments of techniques discussed in the previous section.

19. The method of solution 1, wherein the rule specifies that a manner of the generating the padded samples is responsive to whether a boundary block is coded using a half-pel interpolation.

20. The method of solution 19, wherein the rule specifies whether a different or a same half-pel interpolation as the boundary block is used for the generating the padded samples.

The following solutions show example embodiments of techniques discussed in the previous section.

21. The method of solution 1, wherein the rule specifies that a manner of the generating the padded samples is responsive to whether a boundary block is coded using a combined inter-intra prediction (CIIP) mode.

The following solutions show example embodiments of techniques discussed in the previous section.

22. The method of solution 1, wherein the rule specifies that a manner of the generating the padded samples is responsive to whether a boundary block is coded using a geometric partitioning mode in which the boundary block is partitioned along a non-horizontal or a non-vertical partition.

The following solutions show example embodiments of techniques discussed in the previous section.

23. The method of solution 1, wherein the rule specifies that a manner of the generating the padded samples is responsive to a color component of the video unit or a color format of the video.

The following solutions show example embodiments of techniques discussed in the previous section.

24. The method of solution 1, wherein the bitstream includes an indication of a manner of generating the padded samples.

25. The method of solution 24, wherein the indication is included in a parameter set of at a level of a slice, a picture, a coding tree unit or a coding unit.

The following solutions show example embodiments of techniques discussed in the previous section.

26. The method of solution 1, wherein the rule specifies that manners of the generating the padded samples are different for different boundaries of the video unit.

27. The method of any of above solutions, wherein the video unit is a video picture.

28. The method of any of above solutions, wherein the performing the conversion includes generating the bitstream from the video.

29. The method of any of above solutions, wherein the performing the conversion includes generating the video from the bitstream.

30. A video decoding apparatus comprising a processor configured to implement a method recited in one or more of solutions 1 to 28.

31. A video encoding apparatus comprising a processor configured to implement a method recited in one or more of solutions 1 to 28.

32. A computer program product having computer code stored thereon, the code, when executed by a processor, causes the processor to implement a method recited in any of solutions 1 to 28.

33. A computer readable medium on which a bitstream complying to a bitstream format that is generated according to any of solutions 1 to 28.

34. A method comprising generating a bitstream according to a method recited in any of solutions 1 to 28 and writing the bitstream to a computer readable medium.

35. A method, an apparatus, a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:

generating, during a conversion between a first block of a video and a bitstream of the video, an extended area of a first picture with one or more padded samples different from boundary samples within the first picture, wherein a prediction block of the first block is derived from the first picture; and performing the conversion based on the extended area;

wherein one or more padded samples in the extended area are derived from padded samples in an already padded extended area; and wherein one or more padded samples in the extended area are generated based on a coded information of boundary samples of the first picture or a reference picture.

2. The method of claim 1, wherein the extended area is filled with padded samples copied from samples within the first picture.

3. The method of claim 1, wherein the extended area is filled with padded samples predicted from predicted samples or interpolated samples in the first picture or the reference picture using a prediction method.

4. The method of claim 3, wherein the prediction method comprises an intra prediction, an inter prediction, an intra block copy (IBC) prediction, or a palette prediction.

5. The method of claim 1, wherein the coded information comprises a prediction mode, and the prediction mode comprises an intra prediction mode, an inter prediction mode, or an intra block copy prediction mode.

6. The method of claim 1, wherein one or more padded samples in the extended area are derived from predicted samples which is generated based on a block vector of a block coded with an intra block copy prediction mode.

7. The method of claim 1, wherein one or more padded samples in the extended area are derived from predicted samples in the reference picture, and wherein the predicted samples in the reference picture are generated based on motion compensation using an inter prediction.

8. The method of claim 1, wherein one or more padded samples in the extended area are generated from predicted samples or interpolated samples in the reference picture, wherein the predicted samples are identified based on one or more motion vectors of inter coded blocks.

9. The method of claim 1, wherein one or more padded samples in the extended area are found based on a motion vector of a boundary block inside the first picture, and wherein the motion vector is an original motion vector or a clipped motion vector.

10. The method of claim 1, wherein one or more padded samples in the extended area of the first picture are generated based on a motion-compensated prediction other than duplicating padding or repetitive padding only when boundary samples in the first picture corresponding thereto are coded by an inter prediction.

11. The method of claim 1, wherein when a boundary block is predicted using a bidirectional prediction, one or more padded samples in the extended area are generated based on one of two prediction blocks.

12. The method of claim 11, wherein the one of two prediction blocks is selected based on a rule of cost measurement, and the rule of cost measurement comprises a total sample difference between a specific prediction block and a current block.

13. The method of claim 11, wherein the one of two prediction blocks is selected based on magnitudes of horizontal or vertical components of motion vectors of a boundary block and/or a reference block.

14. The method of claim 1, wherein the conversion comprises encoding the video into the bitstream.

15. The method of claim 1, wherein the conversion comprises decoding the video from the bitstream.

16. An apparatus for processing video data comprising a processor and a non-transitory memory with instructions thereon, wherein the instructions upon execution by the processor, cause the processor to:

generate, during a conversion between a first block of a video and a bitstream of the video, an extended area of a first picture with one or more padded samples different from boundary samples within the first picture, wherein a prediction block of the first block is derived from the first picture; and perform the conversion based on the extended area;

wherein one or more padded samples in the extended area are derived from padded samples in an already padded extended area; and wherein one or more padded samples in the extended area are generated based on a coded information of boundary samples of the first picture or a reference picture.

17. A non-transitory computer-readable storage medium storing instructions that cause a processor to:

generate, during a conversion between a first block of a video and a bitstream of the video, an extended area of a first picture with one or more padded samples different from boundary samples within the first picture, wherein a prediction block of the first block is derived from the first picture; and perform the conversion based on the extended area;

wherein one or more padded samples in the extended area are derived from padded samples in an already padded extended area; and wherein one or more padded samples in the extended area are generated based on a coded information of boundary samples of the first picture or a reference picture.

18. A method for storing a bitstream of a video, comprising:

generating, for a first block of a video, an extended area of a first picture with one or more padded samples different from boundary samples within the first picture, wherein a prediction block of the first block is derived from the first picture;

generating the bitstream based on the extended area; and storing the bitstream in a non-transitory computer-readable recording medium, wherein one or more padded samples in the extended area are derived from padded samples in an already padded extended area; and wherein one or more padded samples in the extended area are generated based on a coded information of boundary samples of the first picture or a reference picture.

* * * * *